United States Patent [19]
Gupta et al.

[11] Patent Number: 5,854,991
[45] Date of Patent: Dec. 29, 1998

[54] METHOD FOR INVERSION PROCESSING OF TRANSVERSE ELECTROMAGNETIC INDUCTION WELL LOGGING MEASUREMENTS

[75] Inventors: Pravin Gupta; Berthold F. Kriegshauser; Zeljko Jericevic; Otto N. Fanini, all of Houston, Tex.

[73] Assignee: Western Atlas International, Inc., Houston, Tex.

[21] Appl. No.: 67,567

[22] Filed: Apr. 28, 1998

Related U.S. Application Data

[63] Continuation-in-part of Ser. No. 686,848, Jul. 26, 1996, Pat. No. 5,781,436.
[51] Int. Cl.$^6$ ............................................ G06F 19/00
[52] U.S. Cl. .................................... 702/7; 324/343
[58] Field of Search .............................. 702/7; 324/339, 324/340, 341, 342, 343

[56] References Cited

U.S. PATENT DOCUMENTS 5,703,773  12/1997  Tabarovsky et al. ...................... 702/7
5,781,436   7/1998  Forgang et al. ........................... 702/7

*Primary Examiner*—Donald E. McElheny, Jr.
*Attorney, Agent, or Firm*—Richard A. Fagin

[57] ABSTRACT

A method for determining the 2-dimensional distribution of horizontal and vertical electrical conductivities of earth formations surrounding a wellbore using measurements made by a transverse electromagnetic induction well logging instrument. A model is generated of the axial distribution of the horizontal and vertical conductivities, from induction signals acquired by the instrument using two-frequency alternating current. The model is generated by calculating an initial estimate of the conductivity distribution and axially inverting the estimate with respect to the measurements made using the two-frequency alternating current. Shoulder correction is applied to measurements made by the instrument using single-frequency alternating current. An estimate of the radial distribution of the conductivities is generated from the shoulder corrected induction signals acquired using the single-frequency alternating current. A 2-dimensional model is made of the conductivity distribution from the model of axial distribution and from the estimate of radial distribution. The two-frequency induction signals are corrected for near wellbore effects using two-frequency whole space responses calculated using the 2-dimensional model. The corrected two-frequency signals are then axially inverted to generate a 2-dimensional model. Using the corrected two-frequency signals in place of the acquired signals, all the previous steps are repeated until differences between the corrected two-frequency induction signals from successive repetitions (iterations) of the steps fall below a predetermined threshold. The two-dimensional model extant when process is halted becomes the final two-dimensional model.

39 Claims, 10 Drawing Sheets

METHOD FOR INVERSION PROCESSING OF TRANSVERSE ELECTROMAGNETIC INDUCTION WELL LOGGING MEASUREMENTS

CROSS-REFERENCE TO RELATED APPLICATIONS

This application is a continuation in part of application Ser. No. 08/686,848 filed on Jul. 26, 1996, entitled, "Method and Apparatus for Transverse Electromagnetic Induction Logging", and assigned to the assignee of this invention now U.S. Pat. No. 5,781,436.

BACKGROUND OF THE INVENTION

1. Field of the Invention

The invention is related generally to the field of electromagnetic induction well logging for determining conductivity (resistivity) of earth formations penetrated by a wellbore. More specifically, the invention is related to methods for inversion processing transverse electromagnetic induction measurements to determine the spatial distribution of conductivity in the earth formations surrounding the wellbore.

2. Description of the Related Art

Electromagnetic induction resistivity well logging instruments are well known in the art. Electromagnetic induction resistivity well logging instruments are used to determine the electrical conductivity (and its converse, resistivity) of earth formations penetrated by a wellbore. Measurements of the electrical conductivity are used for, among other things, inferring the fluid content of the earth formations. Typically, lower conductivity (higher resistivity) is associated with hydrocarbon-bearing earth formations.

The physical principles of electromagnetic induction resistivity well logging are described, for example, in, H. G. Doll, *Introduction to Induction Logging and Application to Logging of Wells Drilled with Oil Based Mud,* Journal of Petroleum Technology, vol. 1, p.148, Society of Petroleum Engineers, Richardson Tex. (1949). Many improvements and modifications to electromagnetic induction resistivity instruments have been devised since publication of the Doll reference, supra. Examples of such modifications and improvements can be found, for example, in U.S. Pat. No. 4,837,517, U.S. Pat. No. 5,157,605 issued to Chandler et al, and U.S. Pat. No. 5,452,762 issued to Beard et al.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art these eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are the ones which are typically hydrocarbon-bearing and are of the most interest to the instrument user. Some earth formations which might be of commercial interest therefore may be overlooked by interpreting a well log made using the electromagnetic induction resistivity well logging instruments known in the art.

One solution to the limitation of the induction instruments known in the art is to include a transverse transmitter coil and a transverse receiver coil on the induction instrument, whereby the magnetic moments of these transverse coils are substantially perpendicular to the axis of the instrument. Such a solution was suggested in, L. A. Tabarovsky and M. I. Epov, *Geometric and Frequency Focusing in Exploration of Anisotropic Seams,* Nauka, USSR Academy of Science, Siberian Division, Novosibirsk, pp. 67–129 (1972). Tabarovsky and Epov suggest various arrangements of transverse transmitter coils and transverse receiver coils, and present simulations of the responses of these transverse coil systems configured as shown therein. Tabarovsky and Epov also describe a method of substantially reducing the effect on the voltage induced in transverse receiver coils which would be caused by eddy currents flowing in the wellbore. The wellbore is typically filled with a conductive fluid known as drilling mud. Eddy currents which flow in the drilling mud can substantially affect the magnitude of voltages induced in the transverse receiver coils. The wellbore signal reduction method described by Tabarovsky and Epov can be described as "frequency focusing", whereby induction voltage measurements are made at more than one frequency, and the signals induced in the transverse receiver coils are combined in a manner so that the effects of eddy currents flowing within certain geometries, such as the wellbore, can be substantially eliminated from the final result. Tabarovsky and Epov, however, do not suggest any configuration of signal processing circuitry which could perform the frequency focusing method suggested in their paper. A device which can measure "frequency focused" transverse induction measurements is described in co-pending patent application Ser. No. 08/686,848, filed on Jul. 26, 1996, now U.S. Pat. No. 5,781,436 entitled, "Method and Apparatus for Transverse Electromagnetic Induction Logging", and assigned to the assignee of this invention.

Interpreting measurements made from conventional induction logging instruments such as described in U.S. Pat. No. 4,837,517, U.S. Pat. No. 5,157,605 issued to Chandler et al, and U.S. Pat. No. 5,452,762 issued to Beard et al typically involves a process known as inversion. Inversion includes generating an initial estimate of the probable spatial distributions of resistivity around the logging instrument, and using the estimated spatial distribution to generate an expected response of the particular logging instrument given the estimated spatial distribution of resistivity. Differences between the expected response and the measured response are used to adjust the model of spatial distribution. The adjusted model of spatial distribution is then used to generate a new expected instrument response. The new expected response is then compared to the measured response. This process is repeated until the difference between the expected response and the measured response reaches a minimum. The apparent spatial distribution of resistivity which generates this "closest" expected response is deemed to be the distribution which most probably represents the spatial distribution of resistivities in the earth formations surveyed by the induction logging instrument. See for example U.S. Pat. No. 5,703,773 issued to Tabarovsky et al.

A principal limitation to using inversion methods known in the art for processing signals from a transverse electromagnetic induction logging instrument such as described in patent application Ser. No. 08/686,848, now U.S. Pat. No. 5,781,436, is that the signals measured by such instruments represent such complex phenomena as to make an initial estimate of the spatial distribution of resistivity impracticable to determine. Further, the measurements made by such instruments are affected by not only the spatial distribution of conductivity, but also by the relative orientation of the earth formations with respect to the axis of the instrument.

Rigorous 2-dimensional inversion processes for transverse electromagnetic induction measurements could be devised using expressions for the magnetic field components described in the Tabarovksy et al reference. However the complexity of rigorous 2-dimensional inversion processes would make the calculation time for such inversion too long to be of practical value.

SUMMARY OF THE INVENTION

The invention is a method for determining the 2-dimensional distribution of horizontal and vertical electrical conductivities in earth formations surrounding a wellbore. The method uses measurements made by a transverse electromagnetic induction well logging instrument. An corrected model is generated of the axial distribution of the horizontal and vertical conductivities, from induction signals acquired by the instrument using two-frequency alternating current. The initial model is generated using a process for deriving an initial estimate of conductivity distribution and optionally uses a one-dimensional iterative process to generate an initial model from the initial estimate. The initial model assumes that there is no wellbore or invaded zone, meaning that there is no change in conductivity in the radial direction. The initial model is processed by a 1-dimensional axial inversion to generate the corrected model.

Induction signals are also acquired by the logging instrument using single frequency alternating current. Shoulder correction is applied to the single-frequency measurements. An estimate of the radial distribution of the conductivities is then generated from the shoulder corrected single-frequency induction signals by 1-dimensional inversion processing. A 2-dimensional model is then made of the conductivity distribution from both the corrected model of axial distribution and from the estimate of radial distribution. The two-frequency induction signals are then corrected for near wellbore effects, using two-frequency whole space responses calculated using the horizontal and vertical conductivities from the estimate of radial distribution of conductivity.

The corrected two frequency induction signals are then processed in a 1-dimensional inversion process substantially the same as is used for generating the input to the step of calculating the single-frequency whole space responses. The initial model is then adjusted, and all the steps are repeated until the differences between the corrected two-frequency induction signals from successive repetitions (iterations) of the steps fall below a predetermined threshold.

The step of generating the initial model of the conductivities includes measuring electromagnetic induction signals induced by induction transmitters oriented along three mutually orthogonal axes. One of these axes is substantially parallel to the instrument axis. The signals are measured using a first set of receivers each having a magnetic moment parallel to one of the orthogonal axes and a second set of receivers each having a magnetic moment perpendicular to one of the orthogonal axes which is also perpendicular to the instrument axis. A relative angle of rotation is calculated of the one of the orthogonal axes which is perpendicular to the instrument axis, with respect to a direction of the horizontal conductivity and the vertical conductivity. This calculation is made from the received signals which are measured perpendicular to the instrument axis. An intermediate measurement tensor is calculated by rotating magnitudes of the receiver signals through a negative of the angle of rotation. A relative angle of inclination is determined of one of the orthogonal axes parallel to the axis of said instrument, with respect to the direction of the vertical conductivity, this angle being determined from the rotated magnitudes. The rotated magnitudes are themselves rotated through a negative of the angle of inclination. The horizontal conductivity is calculated from the magnitudes of the receiver signals after the second step of rotation, and an anisotropy parameter is calculated from the magnitudes after the second step of rotation. The vertical conductivity is calculated from the horizontal conductivity and the anisotropy parameter. In the preferred embodiment of the invention, the step of generating the initial model includes skin effect correcting the two-frequency induction signals acquired by the instrument.

Also in the preferred embodiment, the step of generating the estimate of radial distribution includes selecting initial values of conductivity of an invaded zone, radial extent of the invaded zone, and values of vertical conductivity and horizontal conductivity in the uninvaded formation. Then the induction signals measured by a transmitter and receiver on the instrument which are axially parallel to the axis of the instrument are inverted to obtain first values of the invaded zone conductivity, the radial extent and the vertical conductivity in the uninvaded formation. Induction signals measured by a transmitter and receiver on the instrument perpendicular to the axis of the instrument are then inverted to obtain second values of the invaded zone conductivity, the radial extent and a first value of the horizontal conductivity in the uninvaded formation. Then by simultaneously inverting the axially parallel and the perpendicularly measured induction signals, final values of the invaded zone conductivity, the radial extent and the horizontal and vertical conductivities are obtained.

DESCRIPTION OF THE PREFERRED EMBODIMENT

Figure 1:
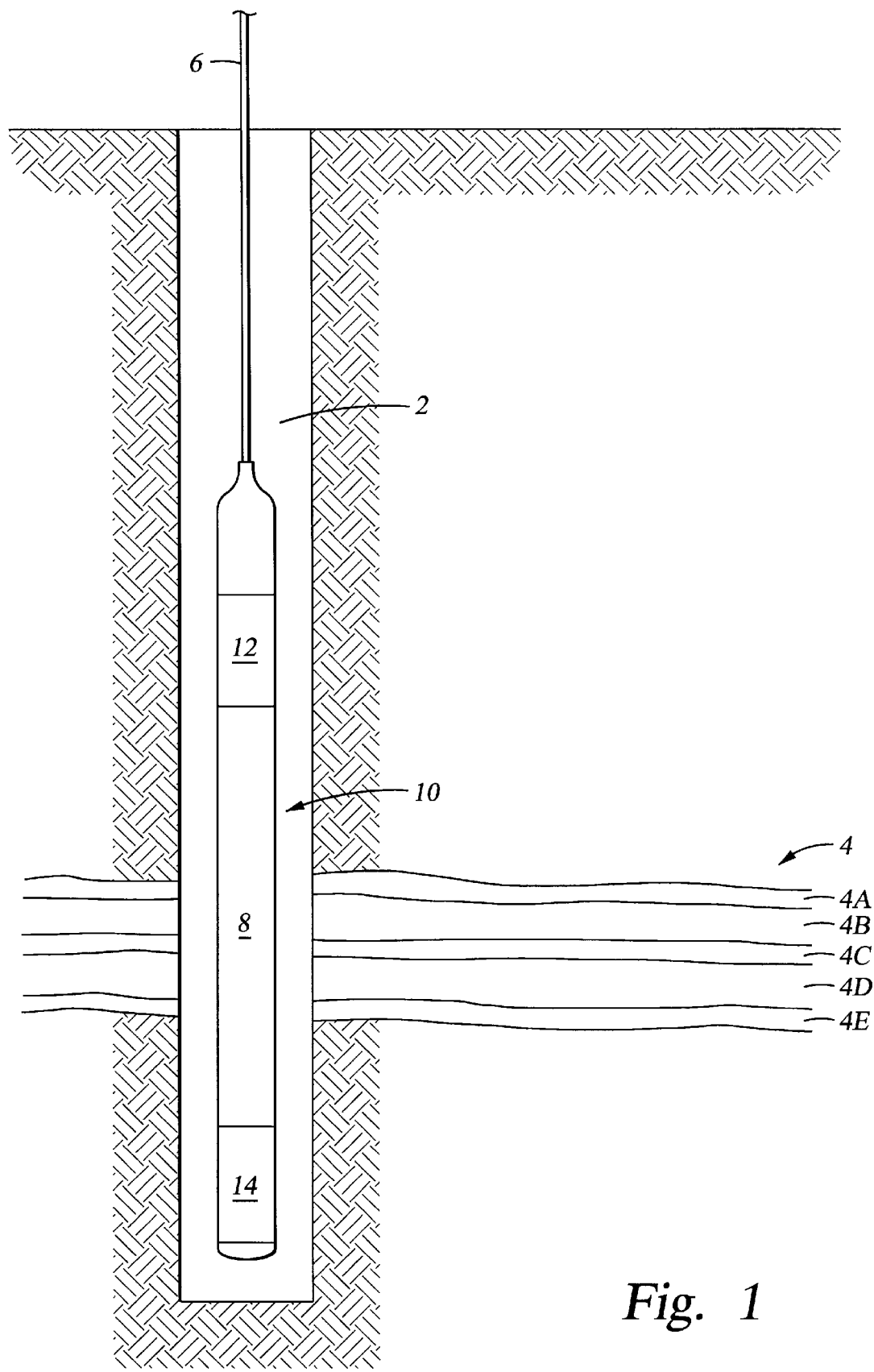
FIG. 1 shows a transverse electromagnetic induction logging instrument disposed in a wellbore drilled through layered earth formations.

A transverse electromagnetic induction well logging instrument which can make measurements suitable for use with this invention is described in U.S. patent application Ser. No. 08/686,848 filed on Jul. 26, 1996, U.S. Pat. No. 5,781,436, entitled, "Method and Apparatus for Transverse Electromagnetic Induction Logging", assigned to the assignee of this invention and incorporated herein by reference. Generally speaking, the well logging instrument disclosed in the Ser. No. 08/646,848 patent application includes three mutually orthogonal induction transmitters, designated TX, TY, TZ, one of which has a magnetic moment generally parallel to the axis of the instrument (this transmitter being designated TZ). This logging instrument also includes mutually orthogonal induction receivers each having a magnetic moment oriented along the same axes as are the transmitters, and further includes "cross-component" receivers each oriented perpendicularly to its respective transmitter for the purpose of measuring the magnitude of induction signals which are induced at right-angles to the respective transmitter. In the instrument described in the Ser. No. 08/646,848 patent application, these cross component receivers are designated CXY and CXZ to indicate that they detect induction signals along the Y- and Z-axes, respectively, from magnetic fields induced by the induction transmitter oriented along the X-axis.

The well logging instrument described in the Ser. No. 08/646,848 patent application can make electromagnetic induction measurements using a so-called "frequency focusing" technique, whereby the effects of induction signals originating in the wellbore can be reduced by selective transmission and reception of a particular two-frequency alternating current. The principle of frequency focusing is explained in a paper by L. A. Tabarovsky and M. I. Epov entitled, *Geometric and Frequency Focusing in Exploration of Anisotropic Seams*, Nauka, USSR Academy of Science, Siberian Division, Novosibirsk, pp. 67–129 (1972). The well logging instrument described in the Ser. No. 08/646,848 patent application can make the particular two-frequency induction measurements at a plurality of different "base" (the lower of the two) frequencies for, among other purposes, determining the frequency-dependence of the induction measurements, as will be further explained. This well logging instrument can also make single-frequency induction measurements at any one of a plurality of different frequencies. The purposes for each type of induction measurement, single- and two-frequency, as related to this invention will be further explained. It should be clearly understood that the method of this invention only requires measurement of single-frequency and two-frequency transverse electromagnetic induction signals along mutually orthogonal axes and along the two cross-components as previously explained. It is not necessary for purposes of this invention to use the particular logging instrument or the particular two-frequency measuring technique which are described in the Ser. No. 08/646,848 patent application. The transverse induction logging instrument described in the Ser. No. 08/646,848 patent application, however, has particular advantages with respect to making the two-frequency transverse induction measurements which are well explained therein.

FIG. 1 shows the transverse electromagnetic induction well logging instrument 10 disposed in a wellbore 2 drilled through layered earth formations. The earth formations are shown generally at 4. The logging instrument 10 can be lowered into and withdrawn from the wellbore 2 by means of an armored electrical cable 6 or similar conveyance known in the art. The logging instrument 10 can be assembled from three subsections: an auxiliary electronics unit 14 disposed at one end of the logging instrument 10; a coil mandrel unit 8 attached to the auxiliary electronics unit 14; and a receiver/signal processing/telemetry electronics unit 12 attached to the other end of the coil mandrel unit 8, this unit 12 typically being attached to the cable 6.

The coil mandrel unit 8 includes mutually orthogonal induction transmitter and receiver coils, as explained in U.S. patent application Ser. No. 08/686,848, for inducing electromagnetic fields in the earth formations 4 and for detecting induction signals induced by eddy currents flowing in the earth formations 4 as a result of the electromagnetic fields induced therein.

The auxiliary electronics unit 14, as explained in patent application Ser. No. 08,646,848 can include a signal generator and power amplifiers to cause alternating currents of selected frequencies to flow through transmitter coils in the coil mandrel unit 8.

The receiver/signal processing/telemetry electronics unit 12 can include receiver circuits for detecting voltages induced in receiver coils located in the coil mandrel unit 8, and circuits for processing these received voltages into signals representative of the conductivities of various earth formation layers, shown as 4A through 4F of the earth formations 4. As a matter of convenience for the system designer, the receiver/signal processing/telemetry electronics unit 12 can include signal telemetry to transmit the conductivity-related signals to the earth's surface along the cable 6 for further processing, or alteratively can store the conductivity related signals in an appropriate recording device (not shown) for processing after the logging instrument 10 is withdrawn from the wellbore 2.

The first step of the method of the invention is to make an initial estimate of the spatial distribution of electrical conductivities in the earth formations surrounding the well logging instrument 10. This can be illustrated by an idealized situation wherein the earth formation is electrically anisotropic and the well logging instrument 10, such as described in the Ser. No. 08/646,848 patent application for example, is oriented so that the magnetic dipoles of some of its transmitters and receivers are parallel to the principal directions (principal axes) of the electrical anisotropy of the earth formations. If the well logging instrument 10 described herein were thus oriented in such electrically anisotropic earth formations, the voltage measurements which would be made by the various receiver coils in the logging instrument could be directly related to the conductivity values of the earth formation along each of the principal directions of the electrical anisotropy. Note that in this idealized situation, there would be substantially no relationship between the magnitudes of voltages induced in the cross-component receiver coils (CXY, CXZ in FIG. 3B of the Ser. No. 08/646,848 patent application) and the conductivity values of the earth formations.

Figure 2:
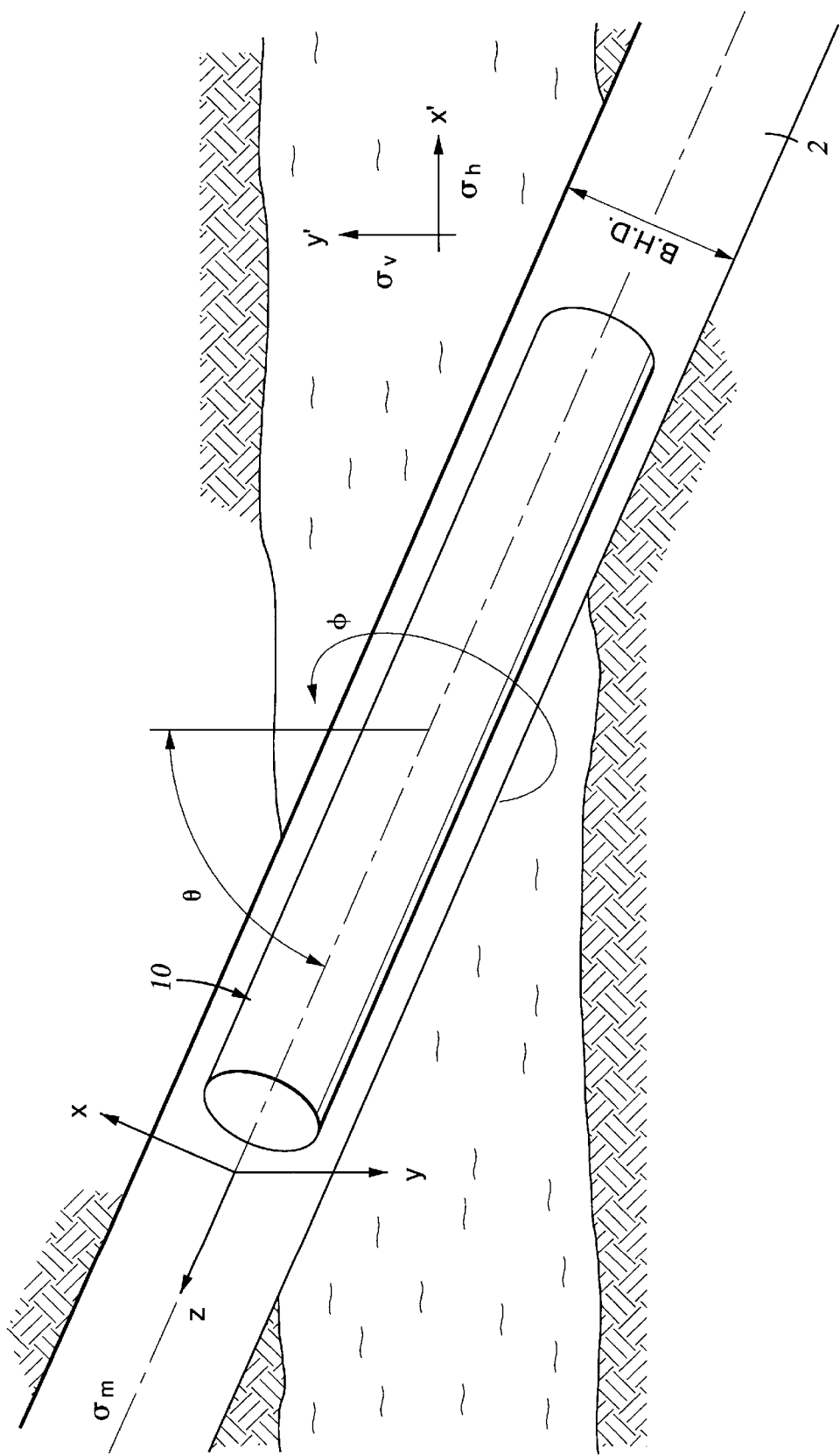
FIG. 2 shows a relative orientation between the sensitive axes of the transmitters and receivers in the instrument of FIG. 1 with respect to principal conductivity directions of the earth formation layers.

However, the well logging instrument 10 will typically not be oriented so that the magnetic dipoles of its transmitters and receivers are parallel to the principal directions of anisotropy of the formations. The receiver voltage measurements therefore cannot be directly related to the electrical conductivity along the principal directions of the anisotropy. A more typical situation is illustrated in FIG. 2. As is well known in the art the wellbore 2 may be inclined from vertical at any particular axial position along its length, and/or the earth formations, such as illustrated by formation layer 4A, may be inclined with respect to horizontal (the inclination angle from horizontal known in the art as the "dip"). A relative angle θ may be subtended between the axis of the instrument 10 shown as z and a "vertical" principal axis of the layer 4A shown by z'. The vertical principal axis z' is defined for purposes of this explanation as being substantially perpendicular to the layering attitude or "bedding planes" of the earth formation, such as shown for layer 4A. The electrical conductivity of the formation layer 4A measured in a direction parallel to the vertical principal axis can be defined as the "vertical" conductivity, $\sigma_v$. The angle subtended, θ, will depend on, among other things, both the inclination of the formation layer 4A from horizontal (with respect to earth's gravity) and the inclination of the wellbore 2 from vertical (with respect to earth's gravity).

A "horizontal" principal axis, x', can be defined as being substantially parallel to the bedding plane of the formation layer 4A. The electrical conductivity of the earth formation measured along a direction parallel to the horizontal principal axis can be referred to as the "horizontal" conductivity and can be represented by $\sigma_h$. The X- or Y-axis of the logging instrument 10 may subtend an angle of rotation, represented by φ, with respect to the plane in which the horizontal principal axis x' of the formation layer 4A lies. For purposes of explaining this part of the invention, it is assumed that the vertical principal axis z' is vertical with respect to the earth's gravity and that the horizontal principal axis x' is perpendicular to earth's gravity. It should be clearly understood, however, that the method of the invention is applicable to any other orientation of the vertical principal axis z' and horizontal principal axis x' with respect to earth's gravity.

Angle φ can be estimated directly from some of the receiver voltage measurements. There are five receiver voltage measurements made by the well logging instrument described in the Ser. No. 08/646,848 patent application. These five receiver voltage measurements can be defined in terms of the transmitter magnetic field orientations and the receiver dipole directions they relate to, such as $H^f_{xx}$ to represent the RX receiver coil measurement made from the magnetic field generated by the TX transmitter coil. The other receiver measurements include $H^f_{xy}$, $H^f_{yy}$, $H^f_{xz}$, $H^f_{zz}$. The five receiver voltage magnetic field representations can be represented for simplicity by a tensor $H^f$. Angle φ can be calculated from the XY cross-component ($H^f_{xy}$) and the XX and YY magnetic components ($H^f_{xx}$, $H^f_{yy}$, respectively) of tensor $H^f$ by the expression: Once the angle φ has been estimated, an intermediate magnetic field component tensor $$\tan(2\phi) = \frac{2H^f_{xy}}{H^f_{xx} - H^f_{yy}} \quad (1)$$

$H^i$ can be determined by rotation of $H^f$ through an angle of magnitude (−φ). From the intermediate magnetic field component tensor, $H^i$ the angle θ can then be estimated by the expression:

$$\tan(2\theta) = \frac{2H^i_{xz}}{H^i_{xx} - H^i_{zz}} \quad (2)$$

After the angle θ is estimated, the tensor $H^i$ can be converted into the coordinate system of the principal axes, x' and z', by rotating through an angle of magnitude (−θ). The resulting tensor, referred to as H represents the magnetic field components that would be measured if the instrument's transmitter and receiver dipoles were parallel to the principal axes of the earth formation layers. Particularly, the X-axis is defined as being coplanar with $\sigma_h$, and the Z-axis is defined as being parallel to $\sigma_v$.

The voltages induced in an X-axis receiver coil (such as RX in FIG. 3B of the Ser. No. 08/646,848 patent application) by the magnetic field generated by an X-axis transmitter (such as TX in FIG. 3A of the Ser. No. 08/646,848 patent application) can be expressed in terms of this magnetic field, defined as $H_{xx}$, by the following expression:

$$H_{xx} = \frac{M_x}{4\pi r^3} [[(\sin\theta\cos\phi)^2 A_u - B_u]E_u + I_0 - (\sin\theta\sin\phi)^2 I_1] \quad (3)$$

Similarly, the voltages induced in a Y-axis receiver by the magnetic field generated by a Y-axis transmitter, represented by $H_{yy}$, can be expressed as:

$$H_{yy} = \frac{M_y}{4\pi r^3} [[(\sin\theta\sin\phi)^2 A_u - B_u]E_u + I_0 - (\sin\theta\cos\phi)^2 I_1] \quad (4)$$

Z-axis receiver voltages induced by the magnetic field from a Z-axis transmitter, $H_{zz}$, can be expressed as:

Cross-component voltages, $H_{xy}$, as measured by a receiver coil (such as CXY in FIG.

$$H_{zz} = \frac{M_z}{4\pi r^3} [\cos^2(\theta) A_u - B_u]E_u \quad (5)$$

3B of the Ser. No. 08/646,848 patent application), and resulting from the magnetic field generated by a transmitter coil (such as TX in FIG. 3A of the Ser. No. 08/646,848 patent application) can be represented by the expression:

$$H_{xy} = \frac{M_x}{4\pi r^3} [A_u E_u + I_1]\sin^2\theta\cos\phi\sin\phi \quad (6)$$

Cross-component voltages, $H_{xz}$, measured by a receiver coil (such as CXZ in FIG. 3B in the Ser. No. 08/646,848 patent application) from the magnetic field generated by a transmitter coil (such as TX in FIG. 3A of the Ser. No. 08/646,848 patent application) can be described by the expression:

$$H_{xz} = \frac{M_x}{4\pi r^3} \cos\theta\sin\theta\sin\phi A_u E_u \quad (7)$$

Certain symbols used in the foregoing expressions can be defined as follows:

$A_u = 3 + 3u + u^2$ $B_u = 1 + u + u^2$ $E_u = e^{-u}$ $$E_v = e^{-v} \quad (8)$$

$$I_o = \frac{-u}{\sin^2\theta}(E_u - E_v)$$

$$I_1 = \frac{1}{\sin^2\theta}[2I_0 - u^2 E_u + (r/s)^2 uv E_v]$$

In the definitions recited in equation (8), the following variables can be defined: $u=-ik_h r$, $v=-ik_v s$, $k_h^2=-i\omega\mu\sigma_h$, $k_v^2=-i\omega\mu\sigma_v$, $r=(\rho^2+z^2)^{1/2}$, $s=(\rho^2+\lambda^2 z^2)^{1/2}$ and $\lambda=k_h/k_v$. Also in these expressions, $z=r\cos\theta$, $x=r\sin\theta\cos\phi$ and $y=r\sin\theta\sin\phi$. The various subscripted M values represent the magnetic moments of each of the transmitters (TX, TY, TZ, in FIGS. 3A, 3B of the Ser. No. 08/646,848 patent application) in the well logging instrument 10.

The "horizontal" conductivity, $\sigma_h$, defined previously as the conductivity in a direction parallel to the formation layering, can then be determined from a low frequency approximation of the signal component $H_{zz}$ (which represents the $H^f_{zz}$ component after it has been "rotated" into the coordinate system of the principal axes).

For a logging instrument such as the one described in patent application Ser. No. 08/686,848 where the magnetic field components are measured using a so-called "three coil" system (including a transmitter coil, a "bucking" receiver coil and a main receiver coil) and the measurements are made at two alternating current frequencies as described earlier herein, the horizontal conductivity $\sigma_h$ can be determined by the expression:

$$\sigma_h = \frac{1}{f_1\mu}\left[\frac{3}{M_z} \frac{\sqrt{f_1}}{\sqrt{\pi}(1-\alpha^3)(\sqrt{f_1}-\sqrt{f_2})}\Im(H_{zz})\right]^{2/3} \quad (9)$$

where $\Im(H_{zz})$ represents the imaginary part of the $H_{zz}$ component signal, and $\alpha$ represents a ratio of axial spacings between the particular transmitter and each of the two receiver coils (the main receiver coil and the bucking coil) used to measure the particular component signal. In equation (9) $f_1$ and $f_2$ represent the lower and higher frequencies, respectively, of the special two-frequency alternating current used to make the transverse induction measurements. The vertical conductivity $\sigma_v$ and the anisotropy parameter $\lambda$ can be then determined from a low frequency approximation of component signal $H_{xx}$. First, the anisotropy parameter $\lambda$ can be calculated by the expression:

$$\frac{1}{\lambda^2} = \frac{1}{3}\left[\frac{4\Im(H_{xx})M_z}{\Im(H_{zz})M_x} - 1\right] \quad (10)$$

and the vertical conductivity $\sigma_v$ can be calculated from the expression:

$$\sigma_v = \frac{\sigma_h}{\lambda^2} \quad (11)$$

It should be noted that equation (10) can be used to calculate horizontal conductivity from the "rotated" $H_{zz}$ component where a well logging instrument such as described herein which makes measurements of receiver voltage using the special two-frequency technique. To make the initial estimate, however, it is not necessary to use an instrument such as the one described in patent application Ser. No. 08/646,848 having "bucking" coils. Appendices A and B include expressions derived for low frequency approximations using so-called "two-coil" systems, and for "three-coil" systems using only a single frequency alternating current for making measurements. So-called "two-coil" systems include only a single transmitter coil and a single receiver coil oriented along one of the X, Y, and Z-axes. A typical three-coil system is disclosed herein, where each of the X, Y, and Z-axes includes a transmitter coil oriented therealong, and main receiver and "bucking" coil oriented along each of the X, Y, and Z-axes. As previously explained, cross component receivers should be included in the logging instrument.

Figure 3:
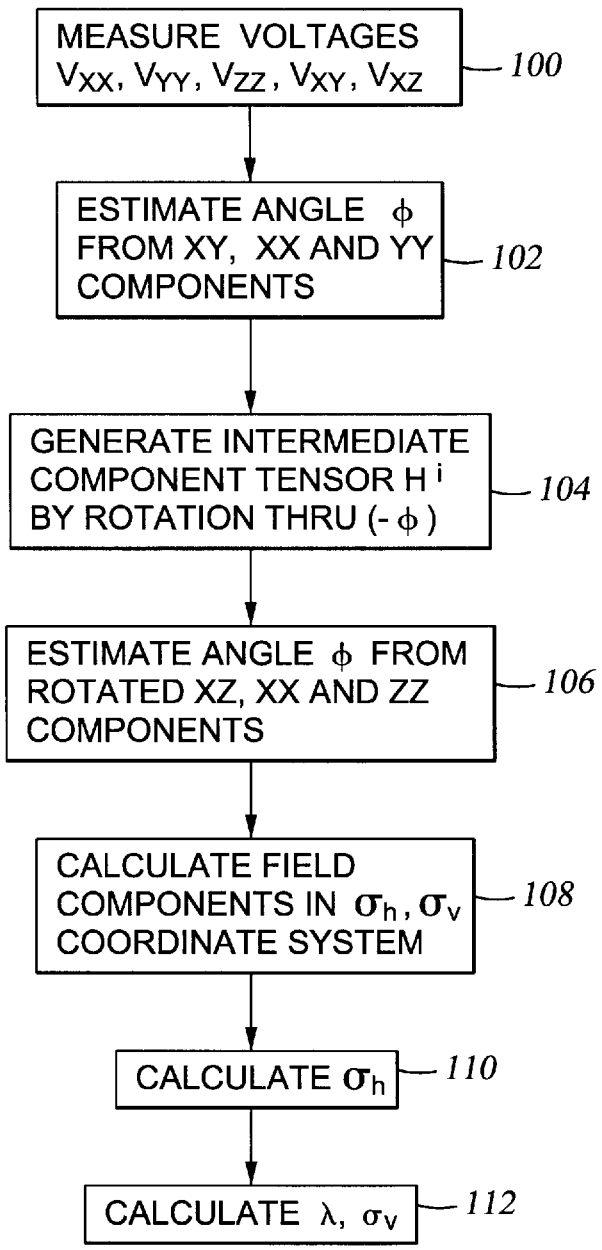
FIG. 3 is a flow chart for calculating an initial estimate of the spatial distribution of conductivities in the formations surrounding the well logging instrument.

FIG. 3 shows a flow chart for the step of making the initial estimate of vertical and horizontal conductivity distribution. Block 100 shows the measurements made of voltages induced in each of the receiver coils. These voltages, indicated as $V_{xx}$, $V_{yy}$, $V_{zz}$, $V_{xy}$, $V_{xz}$, represent the voltages induced in the particular receiver coil oriented along the axis indicated by the second subscript letter (such as $V_{xz}$ indicating the voltage induced in a receiver oriented along the Z-axis), where the voltages are induced by the transmitter coil oriented along the axis indicated by the first subscript letter (such as the same $V_{xz}$ indicating that the voltages are induced by the magnetic field from the X-axis transmitter coil). To make the initial estimate of conductivity distribution it is only necessary to measure these five voltages having the indicated magnetic field orientations. Block 102 shows the step of estimating the angle $\phi$ from the XY, XX and YY receiver voltage signals. After angle $\phi$ is estimated, the measurements are "rotated" through angle $(-\phi)$ to obtain the intermediate component tensor $H^i$, as shown in block 104. In block 106, angle $\theta$ can be estimated from the XZ, ZZ and XX components of the intermediate vector $H^i$. The estimate of angle $\theta$ is used, as shown in block 108, to calculate magnetic field components in the coordinate system of the anisotropy $\sigma_h$, $\sigma_v$. The horizontal conductivity is calculated as shown in block 110 from the magnetic field components in the anisotropy coordinate system, using a low frequency approximation selected from those such as shown in Appendix B, for the particular instrument coil arrangement and frequency measurement system actually used to make the induction voltage measurements. Finally, the anisotropy coefficient and vertical conductivity can be calculated as shown in block 112.

After the initial estimate of distributions of conductivities is made, the next step in the method of the invention is to estimate the axial positions of formation layer boundaries in the earth. Estimation of the position of layer boundaries can be performed in the method of the invention by calculating a second derivative, with respect to axial position (wellbore depth), for the receiver signals measured by either the X-axis (RX in FIG. 3A of the Ser. No. 08/646,848 patent application) or the Y-axis (RY in FIG. 3A of the Ser. No. 08/646,848 patent application) receiver coils. The receiver signal should be the one measured from the magnetic field generated by the transmitter coil oriented along the same axis as the receiver coil. If the signal from the RX receiver coil is used, it should correspond to alternating current passed through the X-axis transmitter coil (TX in FIG. 3A of the Ser. No. 08/646,848 patent application). Similarly, if the signal from the RY receiver coil is used, it should correspond to the alternating current being passed through the Y-axis transmitter coil (TY in FIG. 3A of the Ser. No. 08/646,848 patent application). Such receiver signals are generally transverse to the axis of the instrument and are parallel to the boundaries of the earth formation layers. These signals can be generally characterized as "transverse" induction signals.

In this step of the method of the invention, the receiver signal used for calculating the second derivative should be measured using only a single frequency alternating current passing through the corresponding transmitter coil, rather than the special two-frequency alternating current described earlier herein. As will be further explained, this part of the method of the invention can be repeated for transverse induction measurements made at a plurality of different individual alternating current frequencies to enhance the reliability of the results.

Figures 4, 5:
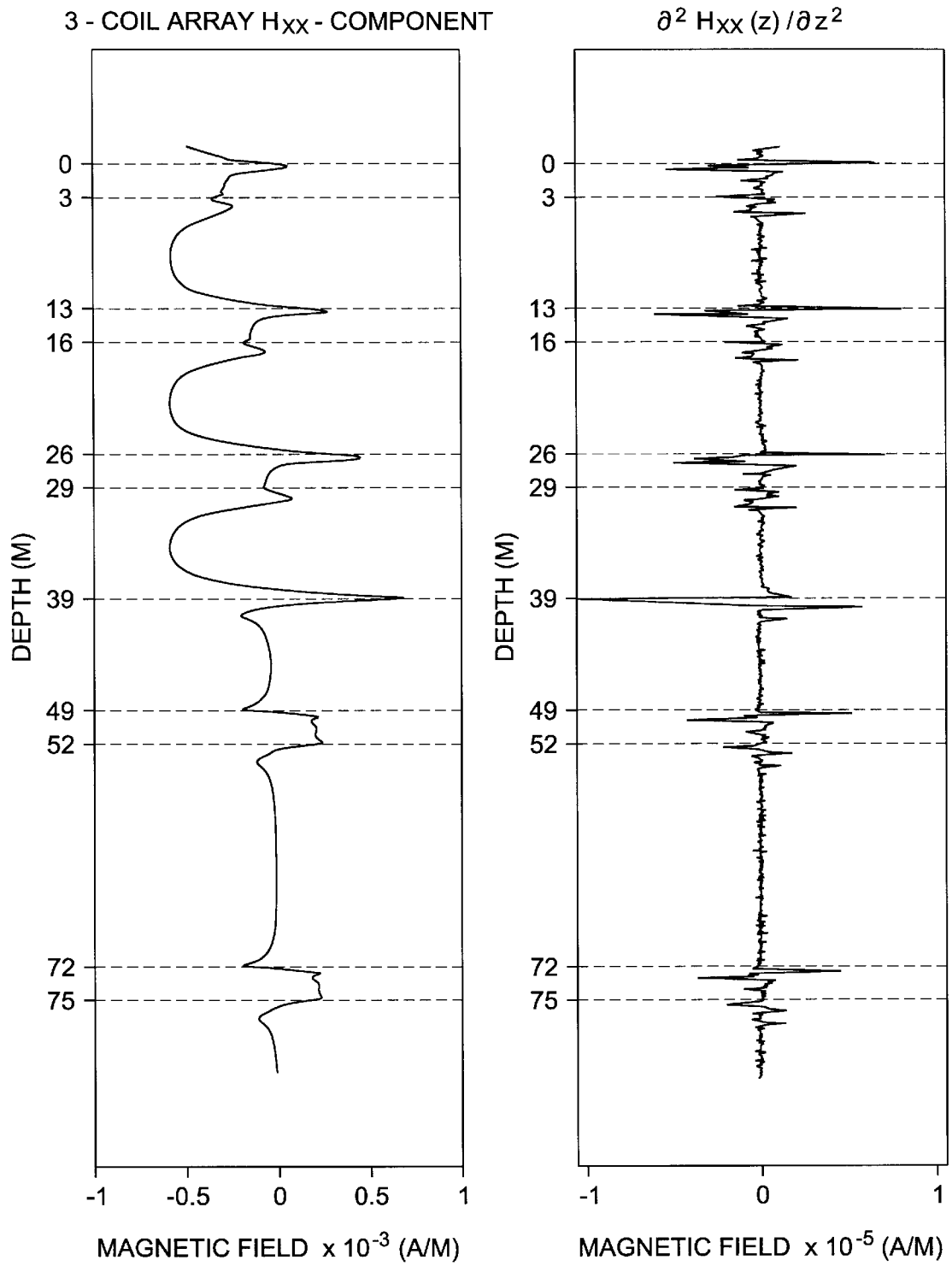
FIG. 4 shows a response of the X-axis receiver in the logging instrument of FIG. 1 to a simulated layered earth formation activated by a magnetic field from the X-axis transmitter.
FIG. 5 shows a second derivative with respect to axial position (depth) of the response shown in FIG. 4.

An example of the response of the RX receiver coil to the magnetic field generated by the TX transmitter at an alternating current frequency of 20 KHz is shown in FIG. 4. FIG. 4 represents a synthesized response of the RX receiver coil to a simulated earth formation having five, 3 meter thick anisotropic layers embedded in an isotropic surrounding earth formation. The axial positions of the anisotropic layers are indicated on the depth scale on the left-hand side of the graph in FIG. 4. The layers are generally transverse to the axis of the instrument. The synthetic signals were corrupted with Gaussian distributed random noise having a standard deviation of about 0.66 $\mu$A/m. The relative amplitude of the noise with respect to the signal amplitude increases with respect to the depth within the modeled earth formations.

The second derivative of the RX receiver coil response is shown over the same modeled earth formations in FIG. 5. The second derivative with respect to depth can be stored in a depth-referenced file similar in form to the depth-referenced files in which the "unprocessed" receiver voltage signals are recorded for processing. Such file formats are well known in the art.

Figures 6, 7:
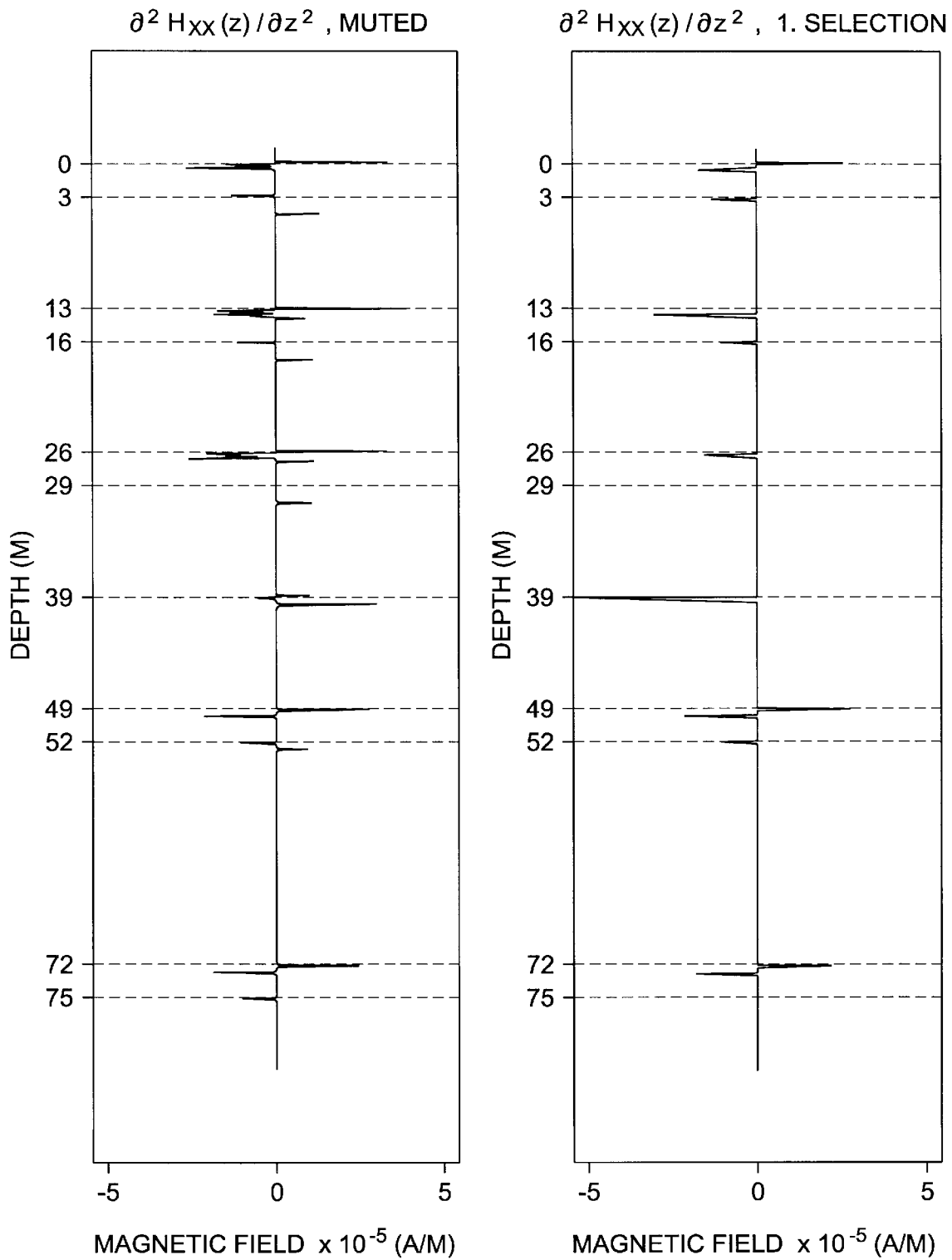
FIG. 6 shows the second derivative curve of FIG. 5 after muting.
FIG. 7 shows the muted second derivative curve of FIG. 6 after thickness filtering the locations of indicated layer boundaries.

The next step in determining the layer boundary positions is to "mute" the second derivative values to reduce the effects of noise and enhance the reliability of the results. An example of muting is shown in FIG. 6. Values of the second derivative which exceed a selected threshold are retained, while all values of the second derivative which fall below the threshold are set to zero.

Then a first derivative with respect to depth can be calculated from the same receiver signals used to calculate the second derivative. The first derivative values are scanned with respect to depth. At each axial (depth) position where the first derivative changes sign (passes through zero), the value of the second derivative is examined. If the value of the second derivative is non-zero at any position where the first derivative changes sign, a bed boundary is inferred. The inferred bed boundary can be written as a non-zero value indication to a depth-referenced file.

Locations of bed boundaries inferred from the first and second derivatives can then be filtered to eliminate locations unlikely to have a bed boundary. This procedure can be referred to as "thickness" filtering. A minimum thickness threshold related to the axial spacing between the transmitter and receiver coil can be selected. The receiver voltage measurements used in this invention have a minimum axial resolution which is related to the axial spacing between the transmitter and receiver coils used to make the measurements. Layer boundary indications which occur at axial positions separated from the previous layer boundary indication, by less than the minimum thickness threshold, can be removed from the layer boundary indication file.

After the minimum thickness filter is applied, it is desirable to filter out any layer boundary indications having axial separations from the previous layer boundary indications of 0.6 and 1.6 meters, when using the instrument coil arrangement shown in FIGS. 3A and 3B. The values of 0.6 and 1.6 meters represent the spacing between the transmitter coil (TX in FIG. 3A of the Ser. No. 08/646,848 patent application) and main receiver coil (RX in FIG. 3A of the Ser. No. 08/646,848 patent application), and the spacing between the main receiver coil RX and the bucking coil (BX in FIG. 3B of the Ser. No. 08/646,848 patent application).

The spacing values used for this filtering step will depend on the actual spacing between the transmitter and receiver coils whose signals are used for layer boundary detection, so the 0.6 and 1.6 meter spacings are not meant to strictly limit the invention. An example of the layer boundary response after the steps of thickness filtering is shown in FIG. 7.

To further improve the results of the method, the entire layer boundary determination procedure can be repeated using receiver signals made at the same receiver coil (based on the magnetic field generated by the same transmitter coil), but made at a different alternating current frequency using a single frequency alternating current to energize the transmitter. The instrument disclosed in the Ser. No. 08/686,848 patent application includes the capability to make induction voltage measurements at a plurality of individual and combined frequencies within a range from about 10 to 210 KHz. Layer boundaries inferred from the thickness-filtered first and second derivatives, made at each individual frequency, can be compared to the layer boundary inferences from the measurements at each other frequency. Layer boundary inferences appearing in the calculations made from signals measured at more than one different frequency can be selected as the locations of layer boundaries for further processing such as by inversion.

Figure 8:
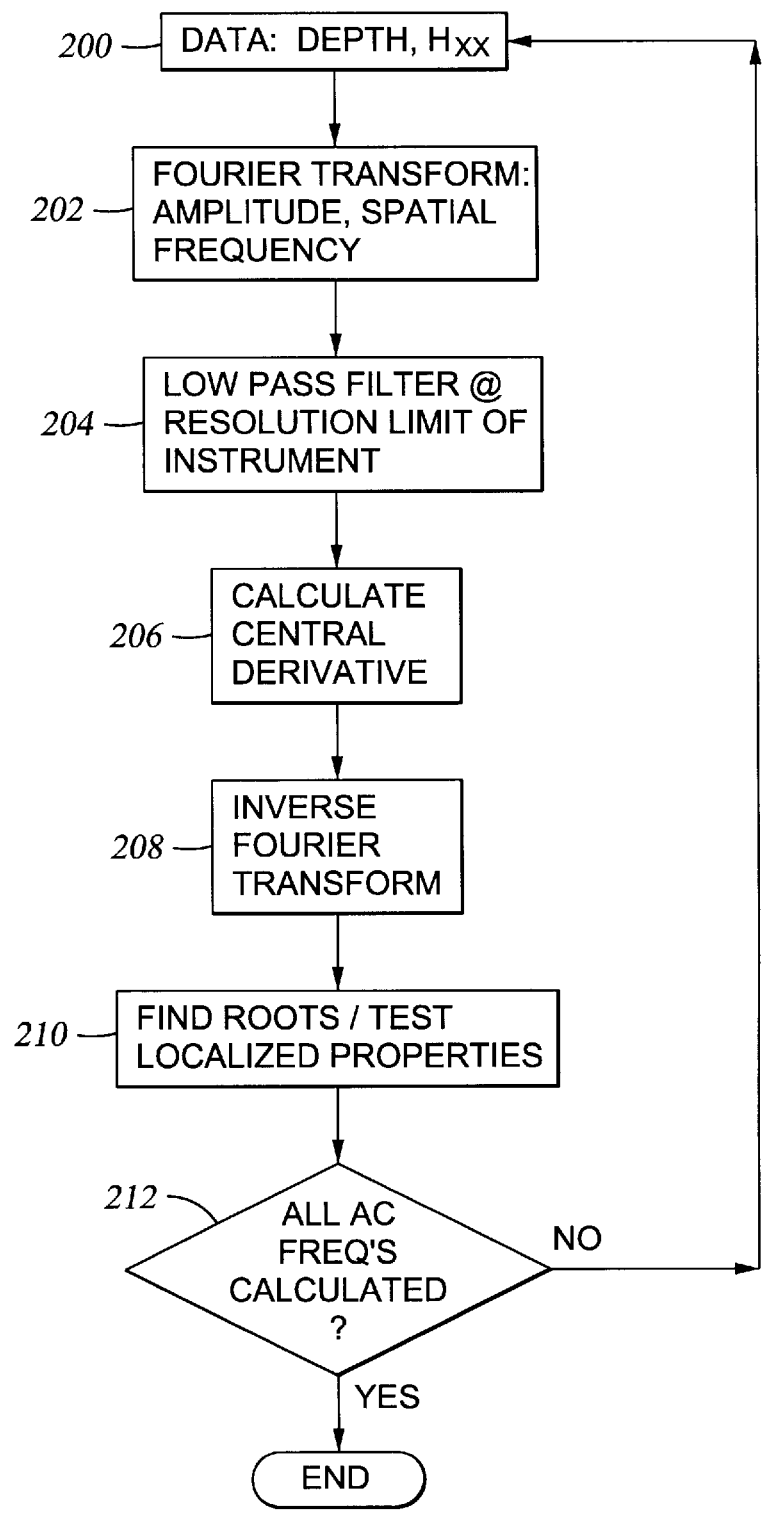
FIG. 8 shows a flow chart of an alternative process for determining axial positions of formation layer boundaries.

An alternative process for determining the axial positions of layer boundaries includes calculation of a first derivative of the transverse induction receiver measurements in the spatial frequency domain. The transverse induction measurements can be made from the same transmitter and receiver coils as for the first embodiment of the invention. Similarly as for the first embodiment of the invention, the transverse induction measurements are preferably made at a single alternating current frequency. This is shown in FIG. 8 in box 200. The first step in this embodiment of the invention is to convert the transverse induction measurements with respect to depth into the spatial frequency domain by using a Fourier transform. The term "spatial frequency" is stated here to avoid confusion with the frequency of the alternating current used to make the induction measurements. The output of the Fourier transform will include relative amplitude and phase of the induction signals with respect to spatial frequency. The Fourier transform is shown in box 202 in FIG. 8.

The Fourier transformed, transverse induction measurements should then be filtered using a low pass filter with a band limit corresponding to the axial resolution of the logging instrument. As explained in the previous embodiment of the invention, the axial resolution will be related to the axial spacing between the transmitter and receiver coil used to make the induction measurements. The low pass filter should include a taper at the band limit to reduce the magnitude of artifacts in the processed results known as Gibb's ringing. The step of low pass filtering is shown in box 204 in FIG. 8.

The next step in this alternative process for determining axial positions of layer boundaries is to calculate a central derivative of the filtered, Fourier transformed signals. This step can be described as follows. The induction signals are recorded as a series of discrete values with respect to depth, with the depth interval generally being equal between each recorded depth. The Fourier transform will typically be a discrete Fourier transform. Therefore the coordinates in the Fourier transform will be represented by discrete individual frequency values. Calculating a central derivative includes calculating a value of induction voltage which would obtain at about one-half depth level above, and one-half depth level below each recorded depth level in the recorded voltage signals. The value of induction voltage which would obtain at one-half depth level either above or below each recorded depth level can be calculated by applying an appropriate phase shift to the Fourier spectrum. Then, the Fourier transform of the difference between the one-half depth level shifted values, and the values of induction voltage which would obtain one full depth level above or below each of the one-half depth level shifted values can be calculated using a formula shown for example in, H. Joseph Weaver, "Applications of Discrete and Continuous Fourier Analysis", John Wiley and Sons, N.Y. (1983) p. 91–96. Then the inverse Fourier-transforming of the difference spectrum is calculated. The inverse Fourier transform of the difference spectrum results in the central difference approximation of the numerical derivative of the voltage signals at each recorded point in the depth (space) domain. The calculation of the central derivative is shown in FIG. 8 in box 206. The result is an approximation of the first derivative of the original induction measurements filtered to remove any layer boundary indications at an axial spacing less than the axial resolution of the instrument. The step of inverse Fourier transforming is shown in box 208 in FIG. 8.

Formation layer boundaries can be inferred at each location where the first derivative passes through a value of zero (the "roots" of the derivative). The roots of the derivative will typically indicate all the layers in the formation, but may include layer indications which do not correspond to a true layer boundary. To verify the nature of layer boundary indications as representing a true layer boundary, localized properties of the derivative can be tested. Localized properties refers to changes in the value of the induction measurements or the derivative within a few depth levels of the depth level of interest. These localized properties can include peak widths, the integral surface under the peak, and the axial range of consistent (directionwise) change in the value of the first derivative. For example, all peaks or troughs narrower than four contiguous depth level points can be discarded as not being representative of a true layer boundary. Similarly, change in value of the first derivative which does not continue in the same direction (increasing or decreasing in value) of less than about four data points can be discarded. Testing the localized properties is shown in box 210 in FIG. 8.

The system operator may wish to test the results by recalculating the axial positions of layer boundaries using single alternating current frequency measurements made at each of the other different alternating current frequencies, just as for the first embodiment of the invention. This is shown in decision box 212 in FIG. 8. It should be noted that this embodiment of the invention typically does not miss any layer boundaries at any individual alternating current (AC) frequency, so the step of repeating the process at different AC frequencies should be considered optional.

It should be clearly understood that the foregoing description of determining the axial position of formation layer boundaries is intended only to improve the results and processing speed of the method of the invention, by eliminating the need to use other well log data, such as gamma ray and acoustic velocity, for example, to determine the axial positions of the layer boundaries. The improvement primarily results from the automated determination of position provided by the method described herein. Other well log measurements typically require visual interpretation by the system operator in order to determine the axial positions of layer boundaries, and as a result the use of such other well log measurements for determining the layer boundaries is typically much slower. It is entirely within the scope of this invention, however, to use such other well log data for the step of locating layer boundaries using methods well known in the art.

It is frequently the case that the initial estimate is sufficiently close to the final result that the initial estimate can be used without further processing as the initial model for inversion processing, which will be further explained. If the system operator desires, the initial estimate can be improved by an iterative processing step which can be explained as follows. The initial estimate of horizontal conductivity, $\sigma_h$, and vertical conductivity, $\sigma_v$, can be corrected for the "skin effect". For purposes of explaining the skin effect correction procedure, the values of vertical and horizontal conductivities calculated as described earlier herein can be referred to as the "apparent" vertical and horizontal conductivities. The apparent horizontal conductivity can be expressed by a series expansion in terms of the alternating current frequency used to make the induction measurements. This series expansion is shown in equation (12) as:

$$S_a = \sum_{k=0}^{\infty} a_{k/2} f^{k/2} \tag{12}$$

where $a_0 = (\sigma_h)^{3/2}$, $\sigma_h$ in this case representing the horizontal conductivity after the skin effect correction is applied (corrected horizontal conductivity). It should be noted that in the series expansion in equation (12) when the value of k is equal to 1, 5, 9, 13, and so on, the corresponding value of $a_k$ is equal to zero.

As previously explained, the instrument described in the Ser. No. 08/646,848 patent application can make measurements at seven different base frequencies. Series expansions such as shown in equation (12) can be calculated for the apparent horizontal conductivity determined for each one of the seven base frequencies at which transverse induction measurements can be made. These seven series expansions can be represented in matrix form as:

$$S = M \cdot A \tag{13}$$

where $$S^T = [S_{ha1} S_{ha2} S_{ha3} S_{ha4} S_{ha5} S_{ha6} S_{ha7}] \tag{14}$$

$$A^T = [a_0 a_1 a_{1.5} a_2 a_3 \ldots] \tag{15}$$

and

Matrix equation (13) is underdetermined. The coefficients can be solved using a minimum norm estimator, which provides a solution as:

$$M = \begin{bmatrix} 1 & f_1 & f_1^{1.5} & f_1^2 & f_1^3 & f_1^{3.5} & \ldots \\ 1 & f_2 & f_2^{1.5} & f_2^2 & f_2^3 & f_2^{3.5} & \ldots \\ \cdot & \cdot & \cdot & \cdot & \cdot & \cdot & \\ \cdot & \cdot & \cdot & \cdot & \cdot & \cdot & \ldots \\ \cdot & \cdot & \cdot & \cdot & \cdot & \cdot & \\ 1 & f_7 & f_7^{1.5} & f_7^2 & f_7^3 & f_7^{3.5} & \ldots \end{bmatrix} \tag{16}$$

$$A = M^T(MM^T)^{-1}S \tag{17}$$

The coefficient of interest, as previously explained, is $a_0$. An expression for $a_0$ from equation (16) can be written as:

$$a_0 = WS \tag{18}$$

where $$W = U(MM^T)^{-1} \tag{19}$$

In equation (19), U represents a 1×7 row vector with all entries equal to unity. The ij-th element, Pij, of product matrix $P=MM^T$ can be determined by the expression:

$$P_{ij} = \frac{1 + (f_i f_j) + (f_i f_j)^{3/2}}{1 - (f_i f_j)^2} \quad (20)$$

The anisotropy parameter, $\lambda$, can also be corrected for the skin effect by the expression:

$$\lambda^2 = \frac{3}{3L_a - 1} \quad (21)$$

where the parameter $L_a$ represents the "apparent" anisotropy parameter with respect to base frequency of the alternating current and can be expressed as:

$$L_a = \left(\frac{1}{f_1 \mu}\right)^{3/2} \left[\frac{4}{M_x} \frac{\sqrt{f_1}}{\sqrt{\pi} \, (1-\alpha^3)(\sqrt{f_1} - \sqrt{f_2})} \Im(H_{xx})\right] \quad (22)$$

Note that $f_1$ in equation (22) represents the lower ("base") frequency and $f_2$ represents the higher frequency of the special two-frequency alternating current measurements used to determine the horizontal and vertical conductivities, whereas This in the expressions in equations (12) through (20) the subscript of the frequency terms indicates which one of the (seven) plurality of base frequencies is represented. $L_a$ can be corrected for the skin effect using expressions similar to those in equations (12) to (20). The skin effect corrected value of $L_a$ can then be used to calculate a skin effect corrected value of the vertical conductivity as shown in equation (11).

It should be clearly understood that the skin effect correction does not require induction measurements to be made at seven different base frequencies or be made at any particular base frequency. More or fewer base frequencies may be used to make skin effect corrected initial estimates of horizontal and vertical conductivity. Generally, the accuracy of the skin effect correction will be improved as the number of base frequencies is increased, while the speed of calculation would be commensurately reduced. It should also be noted that as the number of base frequencies is increased, the complexity and cost of the well logging instrument may be commensurately increased. Seven frequencies have been selected only as a practical compromise between accuracy and speed of calculation, and should not be construed a limitation on the invention.

Figure 9:
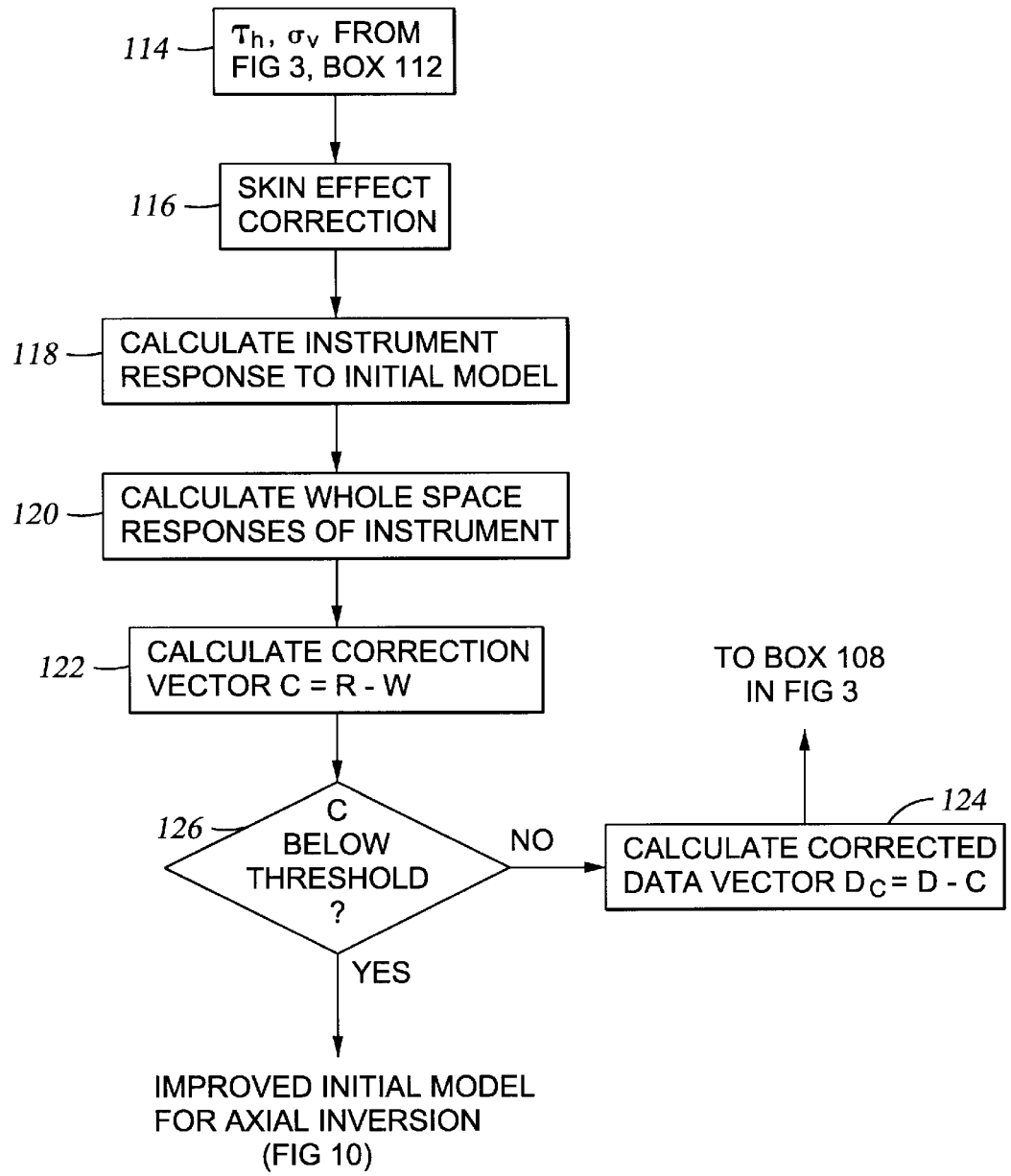
FIG. 9 is a flow chart of an inversion process used to generate an improved initial estimate of the conductivity distribution in the earth formations.

The skin effect corrected initial estimate of horizontal and vertical conductivities can be improved by an iterative process which can be described as follows. Referring now to FIG. 9, the initial estimate, shown in box 114, can be skin effect corrected as shown in box 116. After the skin effect corrected initial estimate is generated, an expected well logging instrument response to the conductivities in the initial estimate can be generated using expressions such as shown for example in, L. A. Tabarovsky and M. I. Epov, *Geometric and Frequency Focusing in Exploration of Anisotropic Seams*, Nauka, USSR Academy of Science, Siberian Division, Novosibirsk, pp. 67–129 (1972). This step is shown in FIG. 9 in box 118. Then for each axial position for which induction signals are measured by the well logging instrument (10 in FIG. 1), a so-called "whole space" response can be calculated. The "whole-space" response, as previously explained, is the response of the instrument which would obtain in the hypothetical situation where the entire earth would consist of a medium having the horizontal and vertical conductivities of the formation layer extant at the particular axial position being evaluated. This is shown in box 120 in FIG. 9. The whole space responses can be calculated using the expressions in equations (3) through (7), for example. It should be noted that the whole-space responses thus calculated are for the special two-frequency alternating current used to make the induction measurements previously described. A correction vector, C, can then be calculated, as shown in box 122, which represents the difference between the calculated "layered" instrument response and the whole-space response. If difference values in the correction vector are smaller than a preselected threshold, the initial model, calculated as previously explained, can be used as the input to a so-called "vertical" (calculated perpendicular to the layer boundaries, or axially) inversion procedure, which will be further explained. This is shown in decision box 126 in FIG. 9. If the difference values in the correction vector exceed the preselected threshold, a "corrected data vector" $D_c$ can be calculated as the difference between the correction vector and the initial estimate (from box 114) to generate a corrected initial estimate. This is shown in box 124 in FIG. 9. The corrected initial estimate can then be used as input to repeat the iterative process, beginning with calculating the magnetic field components in the coordinate system of the anisotropy (box 108 in FIG. 3), continuing with skin effect correction, shown in box 116 and on to calculating the correction vector, at box 122, until the difference values fall below the preselected threshold, reach a minimum value, or until a preselected number of iteration steps have taken place. The output of this procedure can be referred to as the "improved" initial model of horizontal and vertical conductivities.

It should be noted that the iterative process for generating the improved initial model from the skin effect corrected initial estimate is optional. In a substantial number of cases, the initial estimate is a sufficiently accurate representation of the distribution of conductivities as to make the iterative process unnecessary.

The improved initial model of the horizontal and vertical conductivities made using the iterative process described herein is based on so-called "whole space" calculations of the various magnetic field components. "Whole space" indicates that the calculations of magnetic field components assumes that the entire volume of the earth surrounding the instrument consists of formations having the vertical and horizontal conductivities of the formation extant at the axial position for which the particular magnetic field components have been calculated. In generating an initial model of the vertical and horizontal conductivities, the calculation process described herein is therefore repeated for each axial position of interest along the wellbore.

The "improved" initial model of the horizontal and vertical conductivities of the layers of the earth formation can then be used in a so-called "quasi-linear" iterative (inversion) calculation to determine the actual formation horizontal and vertical conductivities. In the invention, a quasi-linear iterative calculation can be used because the initial model (or the "improved" initial model) frequently quite closely represents the actual distribution of conductivities in the earth formations, such that a linear approximation can be used. Using linear approximation substantially reduces the computation time of the actual distribution of conductivities in the earth formations. The process is shown in FIG. 13 generally at 129 and can be explained as follows.

The response of the instrument to the extant earth formations surrounding the wellbore can be represented by vector R(P), where P is a vector representing the actual distribution of conductivities in the earth formations. The improved initial model of conductivity distribution can be represented by $P^0$. The expected response of the instrument to the improved initial model can be represented by $R(P^0)$. Calculating the expected response is shown in FIG. 13 at box 129A. A m×n Jacobian matrix, J, can also be calculated for the improved initial model. The terms in vector R(P) can be represented as Taylor series expansions, for which only the first-order terms need be used in this part of the invention. The difference between the observed (measured) response and the response to the improved initial model can be calculated by the expression:

$$\Delta R = J \cdot \Delta P \quad (23)$$

Figure 13:
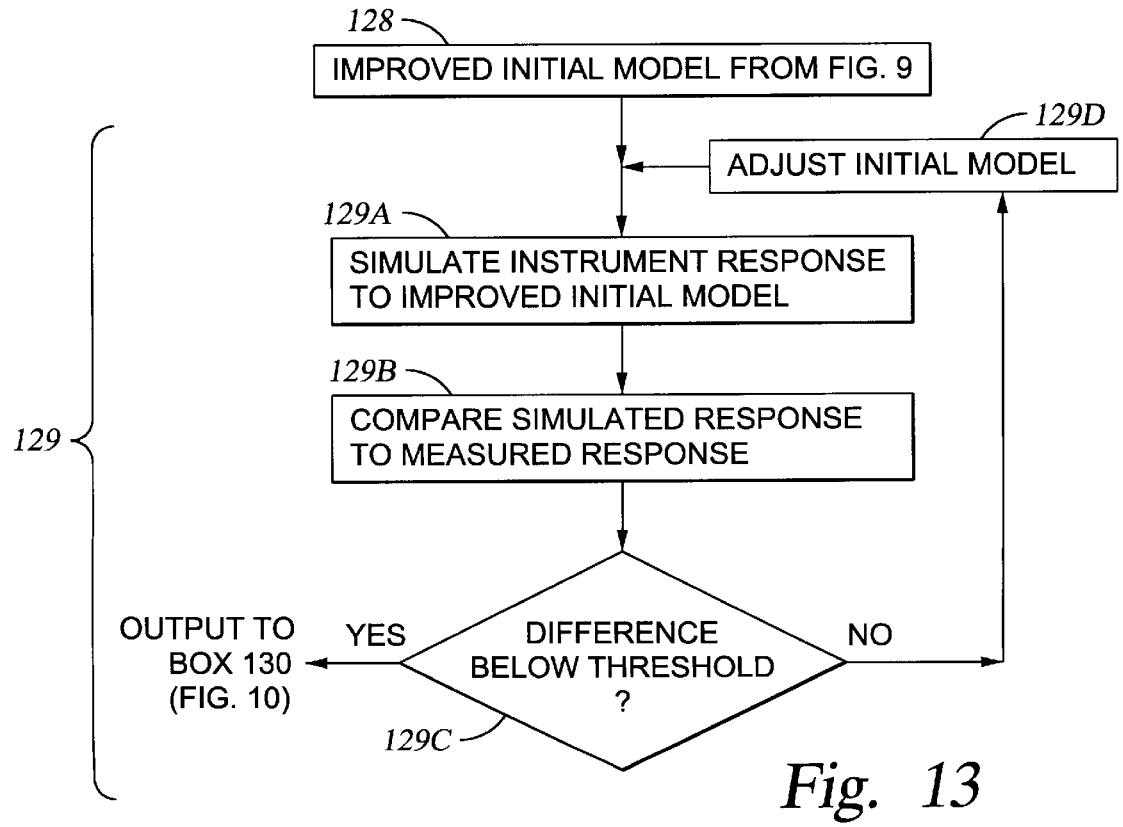
FIG. 13 is a flow chart of the axial inversion process part of the method of the invention.

This is shown at box 129B in FIG. 13. The improved initial model can be adjusted, the calculated response $R(P^0)$ to the adjusted improved initial model can be calculated and the difference between the observed and calculated responses can be determined, until the difference between the observed response and the calculated response falls below a predetermined threshold or reaches a minimum. This is shown at decision box 129C and adjustment step 129D in FIG. 13. Equation (23) can be solved using singular value decomposition, as shown in the following expression:

$$\Delta P = V S^g U^T \Delta R \quad (24)$$

where V represents the eigenvector matrix of $J^T J$, U represents the eigenvector matrix of $JJ^T$ and $S^g$ is a "reciprocal" matrix having non-zero entries only on its diagonal, each of which is the reciprocal of the singular values of matrix J. The preceding iterative process can be referred to as 1-dimensional "vertical" or axial inversion.

The result of the axial inversion process is a corrected axial model of the conductivity distribution surrounding the logging instrument. The corrected axial model does not account, however, for any radial variations in the conductivity distribution around the instrument and the wellbore. Radial variations of conductivity, as is well known in the art, result from the conductivity of drilling fluid in the wellbore itself, and from infiltration of drilling fluid into the pore spaces of permeable formation layers, resulting in "invaded" zones radially proximal to the wellbore which have different conductivities than radially more distal zones which remain unaffected by drilling fluid invasion.

The method of the invention takes particular advantage of the fact that the logging instrument measures transverse electromagnetic induction signals using two-frequency alternating current and also using single-frequency alternating current. As explained in, L. A. Tabarovsky and M. I. Epov, *Geometric and Frequency Focusing in Exploration of Anisotropic Seams*, Nauka, USSR Academy of Science, Siberian Division, Novosibirsk, pp. 67–129 (1972), the measurements made using the two-frequency alternating current are relatively unaffected by the conductivity distribution radially proximal to the well logging instrument, which generally includes effects of the wellbore and invaded zones. The measurement made using the single-frequency alternating current are substantially affected by the wellbore and invaded zone, however. The difference in the extent of effects of the wellbore and invaded zones on the single- and on the two-frequency induction measurements is used in the method of the invention to generate a 2-dimensional (radial and axial) model of the conductivity distribution much faster than would be possible using a rigorous 2-dimensional inversion processing technique.

Figure 10:
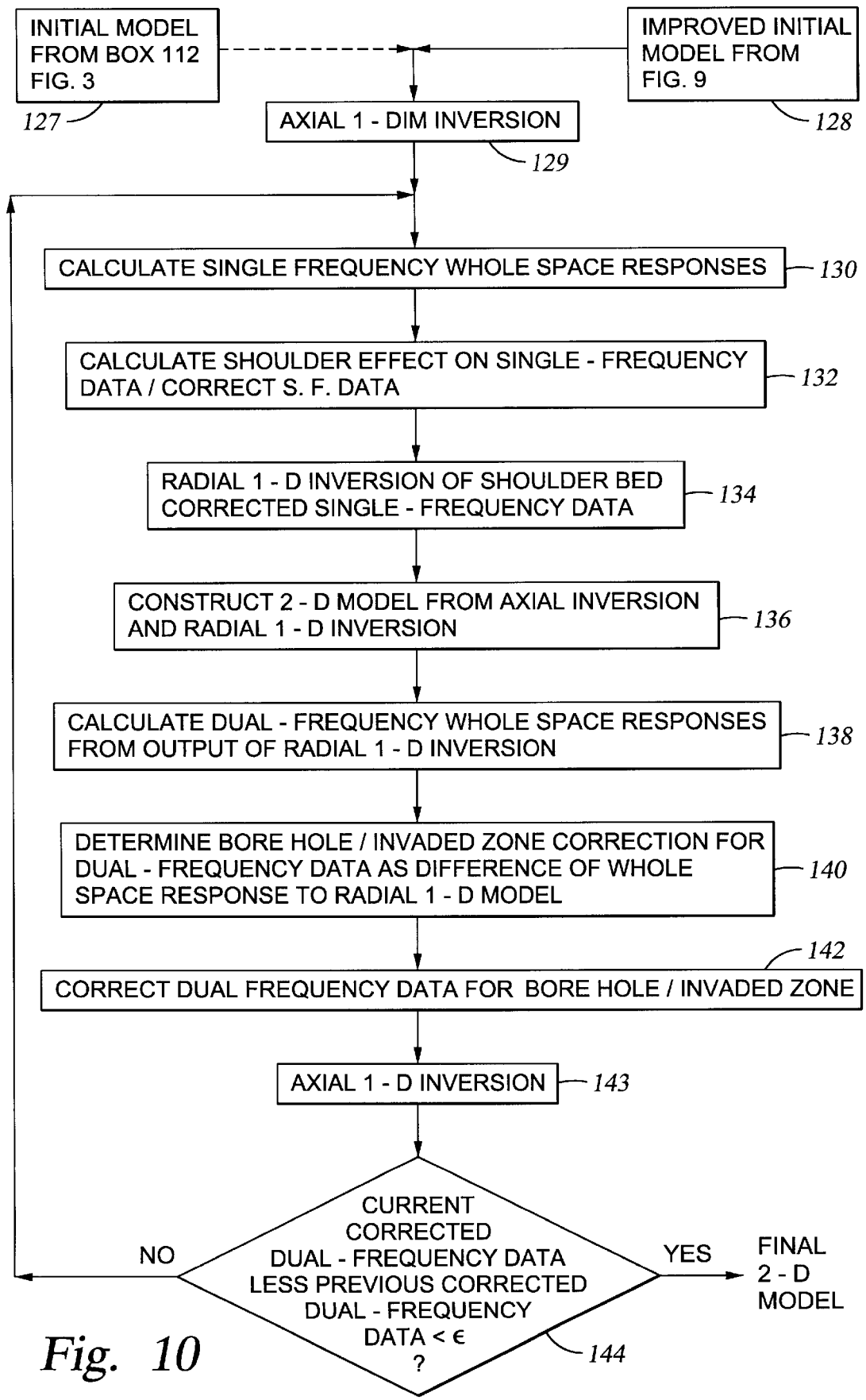
FIG. 10 is a flow chart of a process to correct two-frequency induction measurements for wellbore and invaded zone effects using single-frequency induction measurements.

Referring now to FIG. 10, the improved initial axial model from the iterative process is shown in box 128 as one alternative input to the axial inversion process. The axial inversion is shown in box 129 in FIG. 10. As previously explained, the iterative process for improving the initial estimate is optional. The initial estimate may be in some cases used directly as the input to the inversion process. This is shown in box 127 in FIG. 10.

The output of the axial inversion represents the horizontal and vertical conductivity distribution without the presence of a wellbore or of an "invaded" zone near the wellbore, which will be further explained. The conductivity distribution output from the axial inversion forms the input to the last part of the method of the invention. The vertical and horizontal conductivities in each layer of the axial inversion output (the corrected model) are then used to generate whole space responses of the instrument for the case where single-frequency alternating current would be used to make the induction measurements. Whole space responses can be generated using relationships such as shown in equations (3) through (7). Calculating the whole space responses is shown in FIG. 10 in box 130.

The whole space, single-frequency responses thus calculated are then used to correct the single-frequency induction signal measurements made by the instrument for "shoulder" effects. To do this shoulder correction, the whole space, single-frequency response of the instrument is subtracted from the single-frequency response of the instrument calculated using a "layered" response such as described in the Tabarovsky and Epov paper, supra. The subtraction results in the shoulder correction. This is shown in box 132 in FIG. 10 and can be represented by the following expression:

$$SF(M_{1-D-ver}) - SF(WS_{ver}) = \Delta F_{ver} \quad (25)$$

where the subscript "1-D-ver" indicates that the particular response is from the 1-dimensional "vertical" (axial) inversion process previously described herein. The correction, $\Delta F_{ver}$, calculated using equation (25) can then be applied to the corresponding single-frequency induction measurements made by the instrument over the same axial interval in the wellbore to calculate "shoulder corrected" single-frequency measurements.

The shoulder corrected single-frequency measurements are then used as the input to a radial 1-dimensional inversion process, the object of which is to generate a model of the radial distribution of conductivity at each axial position along the interval of interest. This is shown at box 134 in FIG. 10. The 1-dimensional radial inversion process, for each axial position of interest along the wellbore, generates an output which includes a value of conductivity in the invaded zone, vertical conductivity and horizontal conductivity in the uninvaded zone, and the radial extent of the invaded zone, as will be further explained. The radial inversion process further assumes that the conductivity at each axial position extends infinitely, axially along the wellbore.

Figure 11:
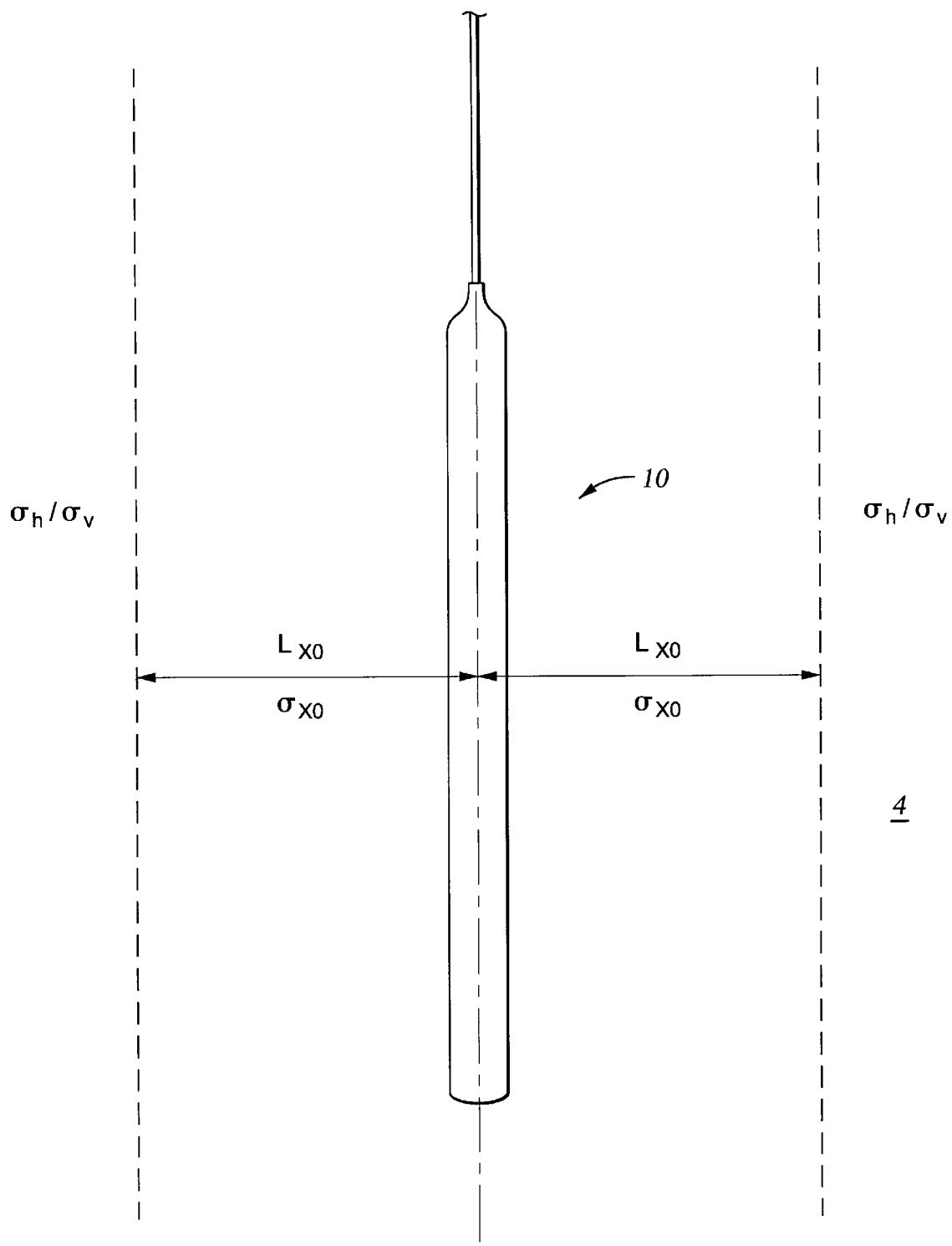
FIG. 11 shows a cylindrical layer model of earth formations used in a radial inversion process part of the method of the invention.
Figure 12:
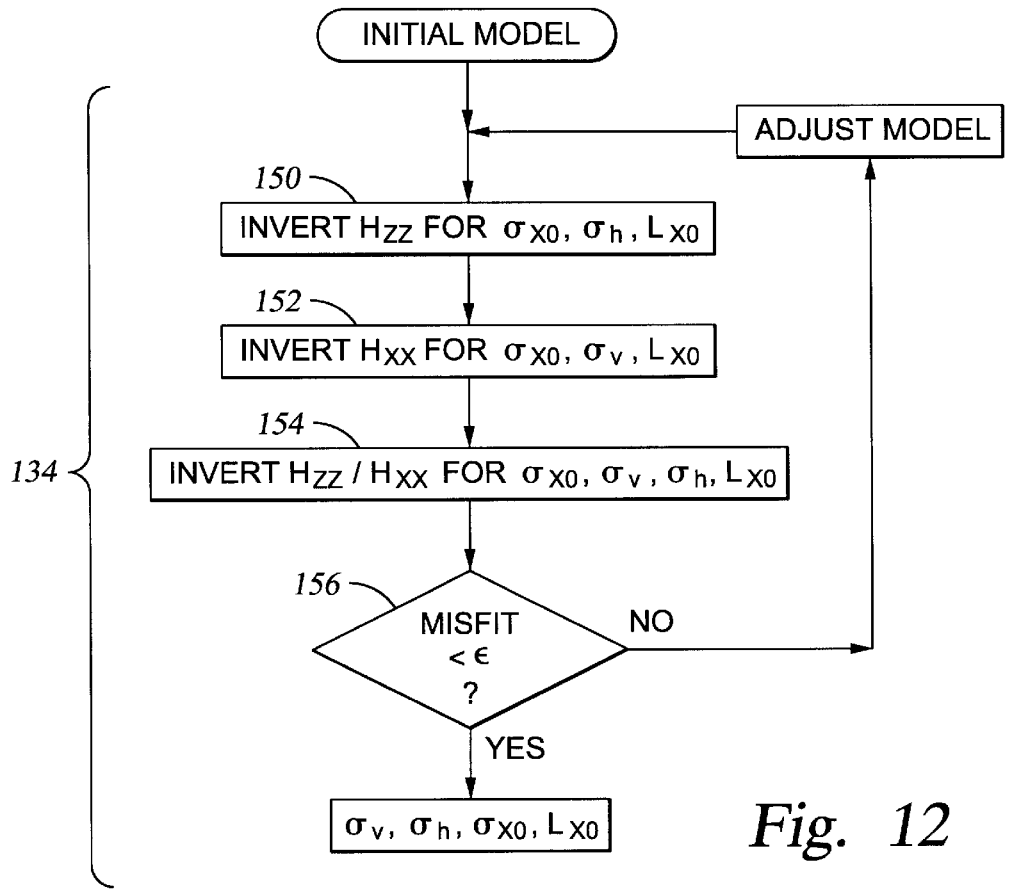
FIG. 12 is a flow chart of the radial inversion process part of the method of the invention.

The radial inversion process can be better understood by referring to FIG. 11. The logging instrument 10 is shown as being suspended in a single earth formation 4 having generally cylindrical layers, each of which has unique values of vertical and horizontal conductivity. The cylindrical layer proximal to the logging instrument 10 in FIG. 11 represents the zone into which drilling fluid has generally infiltrated the pore spaces. This proximal layer has a conductivity represented by $\sigma_{xo}$. The radial extent of the proximal layer is indicated by a radius $L_{xo}$. A radially distal layer shown in FIG. 11 represents the portion of the earth formation into which substantially no drilling fluid has infiltrated the pore spaces (the "uninvaded zone"). The radially distal layer has the vertical and horizontal conductivity values as previously described, $\sigma_v$ and 94$_h$ which represent the "true" vertical and horizontal conductivities of the earth formation absent any drilling fluid infiltration. Referring now to FIG. 12, the radial inversion process begins with an initial estimate of invaded zone conductivity, $\sigma_{xo}$ and radial extent of the proximal layer, $L_{xo}$ as well as the previously determined values of vertical and horizontal conductivity in the radially distal layer. The $H_{zz}$ magnetic field component measured using the single-frequency alternating current can then be inverted, using a process similar to that previously described for calculating the improved initial model of conductivity distribution, or any similar inversion process, to determine conductivity $\sigma_{xo}$ in the radially proximal layer, the radial extent of the proximal layer, $L_{xo}$, and the horizontal conductivity $\sigma_h$ which result in a calculated single-frequency $H_{zz}$ magnetic field component most closely matching the single-frequency $H_{zz}$ magnetic field component actually measured by the well logging instrument. This is shown in box 150 in FIG. 12. Inversion can then be performed by a similar process, using the measured $H_{xx}$ magnetic field component to determine again the conductivity $\sigma_{xo}$ in the proximal layer, the radial extent $L_{xo}$, and the vertical conductivity $\sigma_v$. This is shown in box 152. Then the $H_{xx}$ and $H_{zz}$ magnetic field components can be simultaneously inverted, using a similar inversion process, to optimize the estimate of the conductivity in the proximal layer, and the radial extent of the proximal layer. This is shown in box 154. In decision box 156, the differences between the calculated values of magnetic field components using the calculated conductivities and radial extent are compared to the measured magnetic field components. If the difference (misfit) exceeds a preselected threshold, the estimate of conductivities and radial extent can be adjusted, and the process repeated, until the difference fall below the predetermined threshold, a predetermined number of iterations has taken place, or the misfit reaches a minimum value.

It has been determined that using a model of radial conductivity distribution which includes only one value of invaded zone conductivity is substantially consistent with the changes in formation conductivity which occur as a result of fluid invasion into anisotropic earth formations. For example, if the formation consists of a number of thin, hydrocarbon bearing laminae interleaved with shale laminae, infiltration of oil-based (non-conductive) drilling fluid into the pore spaces of the hydrocarbon bearing laminae will not substantially change their conductivity proximal to the wellbore, and a model which does not include an invade zone will be representative of the true radial distribution of conductivities. Conversely, if highly conductive fluid invades the pore spaces of the hydrocarbon bearing laminae, the conductivity of these laminae will be similar to that of the shale laminae, making the anisotropy very small. In this case, representing the invaded zone with only one value of conductivity is a useful approximation.

Referring once again to FIG. 10, the output of the 1-dimensional radial inversion process is then combined with the corrected model (output from the 1-dimensional axial inversion process), as shown in box 136, to generate a 2-dimensional model of the distribution of conductivities around the well logging instrument. The combination includes using the values of invaded zone resistivity and extent of the invaded zone from the radial 1-dimensional inversion, and using the vertical and horizontal conductivities from the axial inversion as the conductivities in the uninvaded zone.

The output of the radial 1-dimensional inversion process is also used, as shown in box 138, to calculate dual-frequency whole space responses of the logging instrument (using the relationships such as shown in equations (3) through (7) for example). Residual wellbore and invaded zone effect upon the dual-frequency induction measurements made by the logging instrument can be calculated, as shown in box 140, by generating a "near-zone correction factor" using an expression such as the following:

$$DF(M_{1-D-rad}) - DF(WS_{rad}) = \Delta F_{rad} \tag{26}$$

where the subscript "1-D-rad" indicates that the response is from the 1-dimensional radial inversion process. The near-zone correction factor from equation (26) can be applied to the dual-frequency ("DF") measurements to obtain "corrected" dual-frequency measurements. This is shown in box 142.

In box 143, the corrected dual frequency measurements can then be used as the input to a second step of 1-dimensional axial inversion, to generate a final model of the conductivity distribution in the uninvaded zone. Conductivity in the invaded zone, $\sigma_{xo}$, and the radial extent of the invaded zone, $L_{xo}$, determined in the radial 1-dimensional inversion (box 134), can be used in combination with the result of the axial inversion of the corrected two-frequency measurements (box 143) to generate a final 2-dimensional model of the conductivity distribution.

Using the output of the second step of axial inversion (box 143) in place of the model generated by the first step of axial inversion, and using the corrected two-frequency signals in place of the acquired two-frequency signals, the entire process starting with calculating single frequency whole space responses (box 130 in FIG. 3) to calculation of the corrected two-frequency measurements, should then be repeated through at least one iteration. After repeating the entire process, the corrected two-frequency signals from equation (26) for the current iteration of the entire process can then be compared to the corrected two-frequency signals made from the previous iteration of the entire process. If the difference between the corrected two-frequency signals from the current iteration to those from the previous iteration falls below a predetermined threshold (the misfit "$\epsilon$"), the process can then be halted. If the misfit exceeds the predetermined threshold the process can be repeated beginning with the step of calculating single-frequency whole space responses (box 130), until either the misfit falls below the predetermined threshold, a preselected number of iterations have taken place, or when the misfit reaches a minimum. The 2-dimensional model extant at the time the process is halted represents the most likely axial and radial distribution of horizontal and vertical conductivities in the earth formation layers around the logging instrument over the axial interval of interest.

The invention provides a method for determining distribution of horizontal and vertical electrical conductivities in electrically anisotropic earth formations using transverse electromagnetic induction measurements. The method of the invention provides calculated results substantially faster than rigorous 2-dimensional inversion processing, by using taking advantage of the different degrees of effect of the wellbore and invaded zones on single-frequency and dual-frequency transverse electromagnetic induction measurements. Those skilled in the art will devise other embodiments of the invention which do not depart from the spirit of the invention as disclosed herein. Accordingly, the scope of the invention should be limited only by the attached claims.

APPENDIX A: LOW FREQUENCY EXPANSIONS

This appendix presents the low frequency expressions of various factors of field relations (1–5) given in equations (6–11). The expressions are given for the 2-, 3-coil single/dual frequency cases. The various symbols used in the expressions below are $u=-ik_h r$, $v=-ik_v s$, $k_h^2=-i\omega\mu\sigma_h$, $k_v^2=-i\omega\mu\sigma_v$, $r=(\rho^2+z^2)^{1/2}$, $s=(\rho^2+\lambda^2 z^2)^{1/2}$ and $\lambda=k_h/k_v$.

Here $z=rc_\theta$, $x=rs_\theta c_\phi$, $y=rs_\theta s_\phi$ with $s_\theta=\sin\theta$, $c_\theta=\cos\theta$, $s_\phi=\sin\phi$ and $c_\phi=\cos\phi$. FIG. 1 illustrates the angles $\theta$, $\phi$ and the orientations of axes.

2-COIL SINGLE FREQUENCY

This is the simplest case where one transmitter and one receiver coil are used to measure data. The exponential and other terms are expanded in series form and various factors are then derived using these series expansions.

$$A_u = 3 + 3u + u^2 \tag{A1A}$$

$$B_u = 1 + u + u^2 \tag{A1B}$$

$$E_u = e^{-u} = 1 - u + \frac{u^2}{2} - \frac{u^3}{6} + \frac{u^4}{24} - \frac{u^5}{120} + \ldots \tag{A2A}$$

$$E_v = e^{-v} = 1 - v + \frac{v^2}{2} - \frac{v^3}{6} + \frac{v^4}{24} - \frac{v^5}{120} + \ldots \tag{A2B}$$

$$A_u E_u = 3 - \frac{u^2}{2} + \frac{u^4}{8} - \frac{u^5}{15} + \ldots \tag{A3}$$

$$B_u E_u = 1 + \frac{u^2}{2} - \frac{2u^3}{3} + \frac{3u^4}{8} - \frac{2u^5}{15} + \ldots \tag{A4}$$

$$I_{01} = \frac{u^2}{s_\theta^2} \cdot \left\{ 1 - \frac{u}{2} + \frac{u^2}{6} - \frac{u^3}{24} \right\} \tag{A5}$$

$$I_{02} = \frac{uv}{s_\theta^2} \cdot \left\{ 1 - \frac{v}{2} + \frac{v^2}{6} - \frac{v^3}{24} \right\} \tag{A6}$$

$$I_O = I_{01} - I_{02}$$

$$I_{11} = \frac{u^2}{s_\theta^2} \cdot \left\{ \left( \frac{2}{s_\theta^2} - 1 \right) - \left( \frac{1}{s_\theta^2} - 1 \right) u + \left( \frac{1}{3s_\theta^2} - \frac{1}{2} \right) u^2 - \left( \frac{1}{12s_\theta^2} - \frac{1}{6} \right) u^3 \right\} \tag{A8}$$

$$I_{12} = \frac{uv}{s_\theta^2} \cdot \left\{ \left( \frac{2}{s_\theta^2} - \frac{r^2}{s^2} \right) - \left( \frac{1}{s_\theta^2} - \frac{r^2}{s^2} \right) v + \left( \frac{1}{3s_\theta^2} - \frac{r^2}{2s^2} \right) v^2 - \left( \frac{1}{12s_\theta^2} - \frac{r^2}{6s^2} \right) v^3 \right\} \tag{A9}$$

$$I_1 = I_{11} - I_{12} \tag{A10}$$

3-COIL SINGLE FREQUENCY

In this case there are two receiver coils and one transmitter coil. The response is computed by subtracting the two 2-coil responses. The only difference in the these responses results from different transmitter-receiver separations which are related by a factor of $\alpha$.

$$A_u E_u = -\frac{u^2}{2} \cdot (1-\alpha^2) + \frac{u^4}{8} \cdot (1-\alpha^4) - \frac{u^5}{15} \cdot (1-\alpha^5) + . \tag{A11}$$

$$B_u E_u = \frac{u^2}{2} \cdot (1-\alpha^2) - \left( \frac{2u^3}{3} \cdot (1-\alpha^3) \right) + \frac{3u^4}{8} \cdot (1-\alpha^4) - \left( \frac{2u^5}{15} \cdot (1-\alpha^5) \right) \tag{A12}$$

$$I_{01} = \frac{u^2}{s_\theta^2} \cdot \left\{ (1-\alpha^2) - \left( \frac{u}{2} \cdot (1-\alpha^3) \right) + \frac{u^2}{6} \cdot (1-\alpha^4) - \left( \frac{u^3}{24} \cdot (1-\alpha^5) \right) \right\} \tag{A13}$$

$$I_{02} = \frac{uv}{s_\theta^2} \cdot \left\{ (1-\alpha^2) - \left( \frac{v}{2} \cdot (1-\alpha^3) \right) + \frac{v^2}{6} \cdot (1-\alpha^4) - \left( \frac{v^3}{24} \cdot (1-\alpha^5) \right) \right\} \tag{A14}$$

$$I_O = I_{01} - I_{02} \tag{A15}$$

$$I_{11} = \frac{u^2}{s_\theta^2} \cdot \left\{ \left( \frac{2}{s_\theta^2} - 1 \right)(1-\alpha^2) - \left( \frac{1}{s_\theta^2} - 1 \right) u(1-\alpha^3) + \left( \frac{1}{3s_\theta^2} - \frac{1}{2} \right) u^2 (1-\alpha^4) - \left( \frac{1}{12s_\theta^2} - \frac{1}{6} \right) u^3 (1-\alpha^5) \right\} \tag{A16}$$

$$I_{12} = \frac{uv}{s_\theta^2} \cdot \tag{A17}$$

$$\left\{ \left( \frac{2}{s_\theta^2} - \frac{r^2}{s^2} \right)(1-\alpha^2) - \left( \frac{1}{s_\theta^2} - \frac{r^2}{s^2} \right) v(1-\alpha^3) + \left( \frac{1}{3s_\theta^2} - \frac{r^2}{s^2} \right) v^2 (1-\alpha^4) - \left( \frac{1}{12s_\theta^2} - \frac{r^2}{6s^2} \right) v^3 (1-\alpha^5) \right\}$$

$$I_1 = I_{11} - I_{12} \tag{A18}$$

2-COIL DUAL FREQUENCY

In this case the two 2-coil responses pertain to two different frequencies and are related as $$H(f_1,f_2) = H(f_1) - \frac{f_1}{f_2} H(f_2).$$

The expressions of various factors, given below, are also computed the same way.

$$A_u E_u = 3 \left( 1 - \frac{f_1}{f_2} \right) + \frac{u_{12}^4}{8} - \frac{u_{12}^5}{15} + \ldots \tag{A19}$$

$$B_u E_u = \left( 1 - \frac{f_1}{f_2} \right) - \left( \frac{2u_{12}^3}{3} \right) + \frac{3u_{12}^4}{8} - \frac{2u_{12}^5}{15} + \ldots \tag{A20}$$

$$I_{01} = \frac{1}{s_\theta^2} \cdot \left\{ - \left( \frac{u_{12}^3}{2} \right) + \frac{u_{12}^4}{6} - \left( \frac{u_{12}^5}{24} \right) \right\} \tag{A21}$$

$$I_{02} = \frac{1}{s_\theta^2} \cdot \left\{ - \left( \frac{(uv^2)12}{2} \right) + \frac{(uv^3)12}{6} - \left( \frac{(uv^4)12}{24} \right) \right\} \tag{A22}$$

$$I_O = I_{01} - I_{02} \tag{A23}$$

$$I_{11} = \frac{1}{s_\theta^2} \cdot \left[ - \left( \frac{1}{s_\theta^2} - 1 \right) u_{12}^3 + \left( \frac{1}{3s_\theta^2} - \frac{1}{2} \right) u_{12}^4 - \left( \frac{1}{12s_\theta^2} - \frac{1}{6} \right) u_{12}^5 \right] \tag{A24}$$

$$I_{12} = \frac{1}{s_\theta^2} \cdot \left[ - \left( \frac{1}{s_\theta^2} - \frac{r^2}{s^2} \right) (uv^2)_{12} + \left( \frac{1}{3s_\theta^2} - \frac{r^2}{2s^2} \right) (uv^3)_{12} - \left( \frac{1}{12s_\theta^2} - \frac{r^2}{6s^2} \right) (uv^4)_{12} \right] \tag{A25}$$

$$I_1 = I_{11} - I_{12} \tag{A26}$$

Here, $u_{12}^j = u_1^j - (f_1/f_2) u_2^j$ and $(uv^j) = (u_1 v_1^j)_{12} - (f_1/f_2)(u_2 v_2^j)$.

3-COIL DUAL FREQUENCY

The last case comprises 3-coil dual frequency and is obtained as a superposition of the cases 2 and 3.

$$A_u E_u = \frac{u_{12}^4}{8} \cdot (1-\alpha^4) - \frac{u_{12}^5}{15} \cdot (1-\alpha^5) + \ldots \tag{A27}$$

-continued $$B_u E_u = \tag{A28}$$

$$-\left(\frac{2u_{12}^3}{3} \cdot (1-\alpha^3)\right) + \frac{3u_{12}^4}{8} \cdot (1-\alpha^4) - \left(\frac{2u_{12}^5}{15} \cdot (1-\alpha^5)\right)$$

$$I_{01} = \frac{1}{s_\theta^2} \cdot \left\{ -\left(\frac{u_{12}^3}{2} \cdot (1-\alpha^3)\right) + \tag{A29}\right.$$

$$\left. \frac{u_{12}^4}{6} \cdot (1-\alpha^4) - \left(\frac{u_{12}^5}{24} \cdot (1-\alpha^5)\right) \right\}$$

$$I_{02} = \frac{1}{s_\theta^2} \cdot \left\{ -\left(\frac{(uv^2)_{12}}{2} \cdot (1-\alpha^3)\right) + \tag{A30}\right.$$

$$\left. \frac{(uv^3)_{12}}{6} \cdot (1-\alpha^4) - \left(\frac{(uv^4)_{12}}{24} \cdot (1-\alpha^5)\right) \right\}$$

$$I_0 = I_{01} - I_{02} \tag{A31}$$

$$I_{11} = \frac{1}{s_\theta^2} \cdot \left\{ -\left(\frac{1}{s_\theta^2} - 1\right)(1-\alpha^3)u_{12}^3 + \tag{A32}\right.$$

$$\left(\frac{1}{3s_\theta^2} - \frac{1}{2}\right)(1-\alpha^4)u_{12}^4 - \left(\frac{1}{12s_\theta^2} - \frac{1}{6}\right)(1-\alpha^5)u_{12}^5 \right\}$$

$$I_{12} = \frac{1}{s_\theta^2} \cdot \left\{ -\left(\frac{1}{s_\theta^2} - \frac{r^2}{s^2}\right)(1-\alpha^3)(uv^2)_{12} + \tag{A33}\right.$$

$$\left(\frac{1}{3s_\theta^2} - \frac{r^2}{2s^2}\right)(1-\alpha^4)(uv^3)_{12} \right\}$$

$$I_1 = I_{11} - I_{12} \tag{A34}$$

APPENDIX B: LOW FREQUENCY APPROXIMATIONS

The expressions of various factors given in Appendix A when plugged in to equations (1–5) lead to the approximations of the whole-space field components. Here these approximations are given only for the 3-coil single and dual frequency cases. The various symbols used in the expressions below are $u=-ik_h r$, $v=-ik_v s$, $k_h^2=-i\omega\mu\sigma_h$, $k_v^2=-i\omega\mu\sigma_v$, $r=(\rho^2+z^2)^{1/2}$, $s=(\rho^2+\lambda^2 z^2)^{1/2}$ and $\lambda=k_h/k_v$.

Here $z=rc_\theta$, $x=rs_\theta c_\phi$, $y=rs_\theta s_\phi$ with $s_\theta=\sin\theta$, $c_\theta=\cos\theta$, $s_\phi=\sin\phi$ and $c_\phi=\cos\phi$.

FIG. 1 illustrates the angles $\theta$, $\phi$ and the orientations of axes.

3-COIL SINGLE FREQUENCY $$H_{xx} = \tag{B1}$$

$$\frac{M_x}{4\pi r^3} \left[ \left\{ -\frac{(s_\theta c_\phi)^2}{2} - \frac{1}{2} + \frac{1}{s_\theta^2} - s_\phi^2 \left(\frac{2}{s_\theta^2} - 1\right) \right\} - \left\{ \frac{1}{s_\theta^2} - s_\phi^2 \left(\frac{2}{s_\theta^2} - \frac{r^2}{s^2}\right) \right\} \frac{v}{u} \right] (1-\alpha^2)u^2$$

$$H_{yy} = \tag{B2}$$

$$\frac{M_y}{4\pi r^3} \left[ \left\{ -\frac{(s_\theta s_\phi)^2}{2} - \frac{1}{2} + \frac{1}{s_\theta^2} - c_\phi^2 \left(\frac{2}{s_\theta^2} - 1\right) \right\} - \left\{ \frac{1}{s_\theta^2} - c_\phi^2 \left(\frac{2}{s_\theta^2} - \frac{r^2}{s^2}\right) \right\} \frac{v}{u} \right] (1-\alpha^2)u^2$$

$$H_{zz} = \frac{M_z}{4\pi r^3} \left( -\frac{c_\theta^2 + 1}{2} \right) (1-\alpha^2)u^2 \tag{B3}$$

$$H_{yx} = \frac{M_x}{4\pi r^3} \left[ \left\{ -\frac{s_\phi^2}{2} + \left(\frac{2}{s_\theta^2} - 1\right) \right\} - \tag{B4}\right.$$

$$\left. \left\{ \frac{2}{s_\theta^2} - \frac{r^2}{s^2} \right\} \frac{v}{u} \right] c_\phi s_\phi (1-\alpha^2)u^2$$

$$H_{zx} = \frac{M_x}{4\pi r^3} \left( -\frac{c_\theta s_\theta c_\phi}{2} \right) (1-\alpha^2)u^2 \tag{B5}$$

3-COIL DUAL FREQUENCY $$H_{xx} = \tag{B6}$$

$$\frac{M_x}{4\pi r^3} \left[ \left\{ \frac{2}{3} - \frac{1}{2s_\theta^2} + s_\phi^2 \left(\frac{1}{s_\theta^2} - 1\right) \right\} + \right.$$

$$\left. \left\{ \frac{1}{2s_\theta^2} - s_\phi^2 \left(\frac{1}{s_\theta^2} - \frac{r^2}{s^2}\right) \right\} \left(\frac{v_1}{u_1}\right)^2 \right] (1-\alpha^3)\left(1 - \frac{u_2}{u_1}\right) u_1^3$$

$$H_{yy} = \tag{B7}$$

$$\frac{M_y}{4\pi r^3} \left[ \left\{ \frac{2}{3} - \frac{1}{2s_\theta^2} + c_\phi^2 \left(\frac{1}{s_\theta^2} - 1\right) \right\} + \right.$$

$$\left. \left\{ \frac{1}{2s_\theta^2} - c_\phi^2 \left(\frac{1}{s_\theta^2} - \frac{r^2}{s^2}\right) \right\} \left(\frac{v_1}{u_1}\right)^2 \right] (1-\alpha^3)\left(1 - \frac{u_2}{u_1}\right) u_1^3$$

$$H_{zz} = \frac{M_z}{4\pi r^3} \frac{2}{3} (1-\alpha^3)\left(1 - \frac{u_2}{u_1}\right) u_1^3 \tag{B8}$$

$$H_{yx} = \frac{M_x}{4\pi r^3} \left[ \left( -\left(\frac{1}{s_\theta^2} - 1\right)\right) + \tag{B9}\right.$$

$$\left. \left\{ \frac{1}{s_\theta^2} - \frac{r^2}{s^2} \right\} \left(\frac{v_1}{u_1}\right)^2 \right] c_\phi s_\phi (1-\alpha^3)\left(1 - \frac{u_2}{u_1}\right) u_1^3$$

$$H_{zx} = \frac{M_x}{4\pi r^3} \left( \frac{c_\theta s_\theta c_\phi}{8} \right) (1-\alpha^2)\left(1 - \frac{u_2^2}{u_1^2}\right) u_1^4 \tag{B10}$$

What is claimed is:

1. A method for determining distribution of horizontal and vertical electrical conductivities of earth formations surrounding a wellbore using measurements made by a transverse electromagnetic induction well logging instrument, comprising:

generating a model of axial distribution of said horizontal and vertical conductivities from induction signals acquired by said instrument using two-frequency alternating current;

shoulder correcting measurements made by said instrument using single frequency alternating current;

generating an estimate of radial distribution of said horizontal and vertical conductivities from said shoulder corrected measurements;

constructing a 2-dimensional model of conductivity distribution from said model of axial distribution and from said estimate of radial distribution;

correcting said two-frequency induction signals for near wellbore effect using two-frequency whole space responses calculated using said 2-dimensional model;

generating a final model of said conductivity distribution by axially inverting said corrected two-frequency induction signals and combining with said estimate of radial distribution; and using said corrected two-frequency signals in place of said acquired two-frequency signals, repeating said steps of shoulder correcting measurements, generating an estimate of radial distribution, constructing a 2-dimensional model, and correcting said two-frequency induction signals until differences between said corrected two-frequency induction signals calculated in successive repetitions of said steps fall below a predetermined threshold.

2. The method as defined in claim 1 wherein said step of generating said model of axial distribution comprises skin effect correcting said two-frequency induction signals acquired by said instrument.

3. The method as defined in claim 2 wherein said step of generating said model of axial distribution further comprises:

calculating a layered response of said logging instrument to said model for two-frequency alternating current;

calculating whole space responses of said instrument using conductivity values from said model;

determining a difference between said whole space responses and said layered responses;

calculating adjusted two-frequency induction signals using said measured two-frequency induction signals and using said difference between said whole space and said layered responses; and repeating said step of generating said model using said adjusted two-frequency induction signals, and repeating said steps of calculating layered response, calculating whole space response, determining said difference between said whole space and layered responses, and calculating said adjusted two-frequency signals until said difference between said layered response and said whole space response falls below a preselected threshold.

4. The method as defined in claim 1 wherein said step of shoulder correcting comprises:

calculating whole space responses of said instrument to said single-frequency alternating current using conductivity distribution from said initial model;

calculating layered response of said instrument to single frequency alternating current using conductivity values from said initial model;

determining a difference between said layered response and said whole space responses, and correcting said single-frequency measurements made by said instrument using said difference.

5. The method as defined in claim 1 wherein said step of generating said model comprises estimating an axial distribution of said conductivities, said estimating comprising:

calculating a relative angle of rotation of a signal measurement axis which is perpendicular to an axis of said instrument, with respect to a direction of said horizontal conductivity and said vertical conductivity, from induction signals measured along said signal measurement axis;

calculating an intermediate measurement tensor by rotating magnitudes of said receiver signals through a negative of said angle of rotation;

calculating a relative angle of inclination of said axis of said instrument with respect to said direction of said vertical conductivity from said rotated magnitudes;

rotating said rotated magnitudes through a negative of said angle of inclination;

calculating said horizontal conductivity from said magnitudes of said receiver signals after said second step of rotation;

calculating an anisotropy parameter from said magnitudes after said second step of rotation; and calculating said vertical conductivity from said horizontal conductivity and said anisotropy parameter.

6. The method as defined in claim 1 wherein said step of generating said model of axial distribution comprises estimating positions of layer boundaries, comprising:

calculating a first derivative with respect to depth of induction signals made at a selected frequency;

calculating a second derivative with respect to depth of said induction signals;

muting said second derivative;

selecting layer boundaries at axial positions where said muted second derivative is not equal to zero and where said first derivative changes sign;

thickness filtering said selected layer boundaries.

7. The method as defined in claim 6 further comprising repeating said steps of calculating said first and said second derivatives, muting, selecting and filtering, for transverse induction measurements made at a different alternating current frequency than said selected frequency, and selecting locations of layer boundaries where said thickness filtered selected layer boundaries occur at the same axial position for both said frequencies.

8. The method as defined in claim 6 wherein said step of thickness filtering comprises eliminating ones of said selected boundaries having an axial spacing equal to a spacing between an induction transmitter and an induction receiver used to measure said transverse induction signals.

9. The method as defined in claim 6 wherein said step of thickness filtering comprises eliminating ones of said selected boundaries having an axial spacing less than an axial resolution of said transverse electromagnetic induction signals.

10. The method as defined in claim 1 wherein said step of generating said model comprises determining axial positions of layer boundaries, comprising:

Fourier transforming induction signals measured at a selected frequency into the spatial frequency domain;

low pass filtering said Fourier transformed signals at a cutoff about equal to an axial resolution of said induction signals;

calculating a central first derivative of said filtered Fourier transformed signals;

calculating an inverse Fourier transform of said central first derivative;

selecting roots of said inverse Fourier transformed central first derivative; and testing localized properties of said inverse Fourier transformed central first derivative within a selected number of data sample points of said roots, thereby providing indications of formation layer boundaries at axial positions most likely to be true ones of said formation layer boundaries.

11. The method as defined in claim 1 wherein said step of generating said estimate of radial distribution comprises:

selecting initial values of conductivity of an invaded zone, radial extent of said invaded zone, and values of vertical conductivity and horizontal conductivity in an uninvaded zone;

inverting induction signals measured by a transmitter and receiver on said instrument having magnetic moments parallel to an axis of said induction well logging instrument to obtain first values of said invaded zone conductivity, said radial extent and said horizontal conductivity;

inverting induction signals measured by a transmitter and receiver on said instrument having magnetic moments perpendicular to said axis of said instrument to obtain second values of said invaded zone conductivity, said radial extent and a first value of said vertical conductivity;

simultaneously inverting said induction signals from said parallel and said perpendicular transmitters and receivers to obtain final values of said invaded zone conductivity, said radial extent and said horizontal and said vertical conductivities.

12. A method for determining distribution of horizontal and vertical electrical conductivities of earth formations surrounding a wellbore, comprising:

measuring electromagnetic induction signals along three mutually orthogonal axes by passing alternating current through transmitter coils each oriented along one of said axes, and detecting induction voltages in receiver coils as a result of said alternating current passing through said transmitter coils, first ones of said receiver coils each oriented along the same axis as a corresponding one of said transmitter coils, second ones of said receiver coils each oriented along one of said axes perpendicular to said corresponding one of said transmitter coils, said alternating current including two-frequency alternating current and single frequency alternating current;

generating a model of axial distribution of said horizontal and vertical conductivities from induction signals acquired by said instrument using said two-frequency alternating current;

shoulder correcting signals measured by said instrument using said single frequency alternating current;

generating an estimate of radial distribution of said conductivities from said shoulder corrected measurements;

constructing a 2-dimensional model of conductivity distribution from said model of axial distribution and from said estimate of radial distribution;

correcting said two-frequency induction signals for near wellbore effect using two-frequency whole space responses calculated using said 2-dimensional model;

generating a final model of said conductivity distribution by axially inverting said corrected two-frequency induction signals and combining with said estimate of radial distribution; and using said corrected two-frequency signals in place of said acquired two-frequency signals, repeating said steps of generating a model of said axial distribution, shoulder correcting measurements, generating an estimate of radial distribution, constructing a 2-dimensional model, correcting said two-frequency induction signals until differences between said corrected two-frequency induction signals calculated for successive repetitions of said steps fall below a predetermined threshold.

13. The method as defined in claim 12 wherein generating said model of axial distribution comprises skin effect correcting said two-frequency induction signals.

14. The method as defined in claim 12 wherein said step of shoulder correcting comprises:

calculating whole space responses of said instrument to single-frequency alternating current using conductivity values from said model;

calculating layered responses of said instrument to single frequency alternating current using conductivity values from said model;

determining a difference between said layered response and said whole space response and correcting single-frequency measurements made by said instrument using said difference.

15. The method as defined in claim 12 wherein said step of generating said model comprises:

estimating an axial distribution of said conductivities comprising, calculating a relative angle of rotation of said one of said orthogonal axes which is perpendicular to said instrument axis, with respect to a direction of said horizontal conductivity and said vertical conductivity, from said received signals measured perpendicular to said instrument axis, calculating an intermediate measurement tensor by rotating magnitudes of said receiver signals through a negative of said angle of rotation, calculating a relative angle of inclination of one of said orthogonal axes parallel to said axis of said instrument, with respect to said direction of said vertical conductivity, from said rotated magnitudes, rotating said rotated magnitudes through a negative of said angle of inclination, calculating said horizontal conductivity from said magnitudes of said receiver signals after said second step of rotation, calculating an anisotropy parameter from said magnitudes after said second step of rotation, and calculating said vertical conductivity from said horizontal conductivity and said anisotropy parameter; and axially inverting said initial estimate to generate said model of said conductivity distribution.

16. The method as defined in claim 12 wherein said step of generating said model includes estimating axial positions of layer boundaries, comprising:

calculating a first derivative with respect to depth of induction signals made at a selected frequency;

calculating a second derivative with respect to depth of said induction signals;

muting said second derivative;

selecting layer boundaries at axial positions where said muted second derivative is not equal to zero and where said first derivative changes sign;

thickness filtering said selected layer boundaries.

17. The method as defined in claim 16 further comprising repeating said steps of calculating said first and said second derivatives, muting, selecting and filtering, for transverse induction measurements made at a different alternating current frequency than said selected frequency, and selecting locations of layer boundaries where said thickness filtered selected layer boundaries occur at the same axial position for both said frequencies.

18. The method as defined in claim 12 wherein said step of thickness filtering comprises eliminating ones of said selected boundaries having an axial spacing equal to a spacing between an induction transmitter and an induction receiver used to measure said transverse induction signals.

19. The method as defined in claim 12 wherein said step of thickness filtering comprises eliminating ones of said selected boundaries having an axial spacing less than an axial resolution of said transverse electromagnetic induction signals.

20. The method as defined in claim 12 wherein said step of generating said model includes determining axial positions of layer boundaries, comprising:

Fourier transforming induction signals measured at a selected frequency into the spatial frequency domain;

low pass filtering said Fourier transformed signals at a cutoff about equal to an axial resolution of said induction signals;

calculating a central first derivative of said filtered Fourier transformed signals;

calculating an inverse Fourier transform of said central first derivative;

selecting roots of said inverse Fourier transformed central first derivative; and testing localized properties of said inverse Fourier transformed central first derivative within a selected number of data sample points of said roots, thereby providing indications of formation layer boundaries at axial positions most likely to be true ones of said formation layer boundaries.

21. The method as defined in claim 12 wherein said step of generating said model further comprises:

calculating a layered response of said logging instrument to said model for two-frequency alternating current;

calculating whole space responses of said instrument using conductivity values from said model;

determining a difference between said whole space responses and said layered responses;

calculating adjusted two-frequency induction signals from said two-frequency induction signals and said difference between said whole space and said layered responses; and repeating said step of generating said model, and repeating said steps of calculating layered response, calculating whole space response, determining said difference between said whole space and layered responses, and calculating said adjusted two-frequency signals until said difference between said layered and whole space responses falls below a preselected threshold.

22. The method as defined in claim 12 wherein said step of generating said estimate of radial distribution comprises:

selecting initial values of conductivity of an invaded zone, radial extent of said invaded zone, and values of vertical conductivity and horizontal conductivity;

inverting induction signals measured by a transmitter and receiver on said instrument axially parallel to an axis of said instrument to obtain first values of said invaded zone conductivity, said radial extent and said vertical conductivity;

inverting induction signals measured by a transmitter and receiver on said instrument perpendicular to said axis of said instrument to obtain second values of said invaded zone conductivity, said radial extent and a first value of said horizontal conductivity;

simultaneously inverting said axially parallel and said perpendicularly measured induction signals to obtain final values of said invaded zone conductivity, said radial extent and said horizontal and vertical conductivities.

23. A method for determining a 2-dimensional distribution of conductivities of earth formation penetrated by a wellbore from measurements made by a transverse electromagnetic induction logging instrument, comprising:

generating a model of axial conductivity distribution by inverting measurements made by said instrument using two-frequency alternating current;

generating an estimate of radial conductivity distribution by inverting measurements made by said instrument using single-frequency alternating current;

generating a model of said 2-dimensional distribution by combining said model and said estimate.

24. The method as defined in claim 23 wherein said step of generating said model of axial conductivity distribution further comprises:

calculating a layered response of said logging instrument to said model for two-frequency alternating current;

calculating whole space responses of said instrument using conductivity values from said model;

determining a difference between said whole space responses and said layered responses;

calculating adjusted two-frequency induction signals from said two-frequency induction signals and said difference between said whole space and said layered responses; and repeating said step of generating said model, and repeating said steps of calculating layered response, calculating whole space response, determining said difference between said whole space and layered responses, and calculating said adjusted two-frequency signals until said difference between said layered and whole space responses falls below a preselected threshold.

25. The method as defined in claim 23 wherein said step of generating said estimate of radial conductivity distribution comprises:

selecting initial values of conductivity of an invaded zone, radial extent of said invaded zone, and values of vertical conductivity and horizontal conductivity;

inverting induction signals measured by a transmitter and receiver on said instrument having magnetic moments parallel to an axis of said instrument to obtain first values of said invaded zone conductivity, said radial extent and said horizontal conductivity;

inverting induction signals measured by a transmitter and receiver on said instrument having magnetic moments perpendicular to said axis of said instrument to obtain second values of said invaded zone conductivity, said radial extent and a first value of said vertical conductivity;

simultaneously inverting said induction signals measured parallel and perpendicular to said instrument axis to obtain final values of said invaded zone conductivity, said radial extent and said horizontal and vertical conductivities.

26. The method as defined in claim 23 wherein said step of generating said model of axial conductivity distribution further comprises:

calculating a layered response of said logging instrument to said model for said two-frequency alternating current;

calculating whole space responses of said instrument to said two-frequency alternating current using conductivity values from said model;

determining a difference between said whole space responses and said layered responses;

calculating adjusted two-frequency induction signals from said two-frequency induction signals and said difference between said whole space and said layered responses; and repeating said steps of generating said model, calculating layered response, calculating whole space response, determining said difference between said whole space and layered responses, and calculating said adjusted two-frequency signals until said difference between said layered and whole space responses falls below a preselected threshold.

27. The method as defined in claim 23 wherein said step of generating said model of axial conductivity distribution comprises:

estimating an axial distribution of said conductivities, said estimating comprising measuring electromagnetic induction signals induced by induction transmitters oriented along three mutually orthogonal axes, one of said axes substantially parallel to an instrument axis, said signals measured using first receivers each having a magnetic moment parallel to one of said orthogonal axes and second receivers each having a magnetic moment perpendicular to a one of said orthogonal axes which is perpendicular to said instrument axis, calculating a relative angle of rotation of said one of said orthogonal axes which is perpendicular to said instrument axis, with respect to a direction of said horizontal conductivity and said vertical conductivity, from said received signals measured perpendicular to said instrument axis, calculating an intermediate measurement tensor by rotating magnitudes of said receiver signals through a negative of said angle of rotation, calculating a relative angle of inclination of one of said orthogonal axes parallel to said axis of said instrument, with respect to said direction of said vertical conductivity, from said rotated magnitudes, rotating said rotated magnitudes through a negative of said angle of inclination, calculating said horizontal conductivity from said magnitudes of said receiver signals after said second step of rotation, and calculating an anisotropy parameter from said magnitudes after said second step of rotation and calculating said vertical conductivity from said horizontal conductivity and said anisotropy parameter; and axially inverting said initial estimate to generate said model of said conductivity distribution.

28. The method as defined in claim 23 wherein generating said model of axial conductivity distribution comprises skin effect correcting said two-frequency induction signals acquired by said instrument.

29. The method as defined in claim 28 wherein said step of generating said model of axial conductivity distribution further comprises:

calculating a layered response of said logging instrument to said model for two-frequency alternating current;

calculating whole space responses of said instrument using conductivity values from said model;

determining a difference between said whole space responses and said layered responses;

calculating adjusted two-frequency induction signals from said two-frequency induction signals and said difference between said whole space and said layered responses; and repeating said step of generating said model, and repeating said steps of calculating layered response, calculating whole space response, determining said difference between said whole space and layered responses, and calculating said adjusted two-frequency signals until said difference between said layered and whole space responses falls below a preselected threshold.

30. A method for determining distribution of horizontal and vertical electrical conductivities of earth formations surrounding a wellbore, comprising:

measuring electromagnetic induction signals along three mutually orthogonal axes by passing alternating current through transmitter coils each oriented along one of said axes, and detecting induction voltages in receiver coils as a result of said alternating current passing through said transmitter coils, first ones of said receiver coils each oriented along the same axis as a corresponding one of said transmitter coils, second ones of said receiver coils each oriented along one of said axes perpendicular to said corresponding one of said transmitter coils, said alternating current including two-frequency alternating current and single frequency alternating current;

generating a model of axial conductivity distribution by inverting measurements using said two-frequency alternating current;

generating an estimate of radial conductivity distribution by inverting measurements made using said single-frequency alternating current;

generating a model of said 2-dimensional distribution by combining said model and said estimate.

31. The method as defined in claim 30 wherein said step of generating said axial model further comprises:

calculating a layered response of said logging instrument to said model for said two-frequency alternating current;

calculating whole space responses of said instrument using conductivity values from said model;

determining a difference between said whole space responses and said layered responses;

calculating adjusted two-frequency induction signals from said two-frequency induction signals and said difference between said whole space and said layered responses; and repeating said step of generating said model, and repeating said steps of calculating layered response, calculating whole space response, determining said difference between said whole space and layered responses, and calculating said adjusted two-frequency signals until said difference between said layered and whole space responses falls below a preselected threshold.

32. The method as defined in claim 30 wherein said step of generating said estimate of radial distribution comprises:

selecting initial values of conductivity of an invaded zone, radial extent of said invaded zone, and values of vertical conductivity and horizontal conductivity;

inverting signals measured by a first one of said receivers having a magnetic moment parallel to an axis of said instrument to obtain first values of said invaded zone conductivity, said radial extent and said horizontal conductivity, said signals induced by one of said transmitters having a magnetic moment parallel to said magnetic moment of said one of said receivers;

inverting signals measured by a second one of said receivers having a magnetic moment perpendicular to said axis of said instrument to obtain second values of said invaded zone conductivity, said radial extent and a first value of said vertical conductivity, said signals induced by one of said transmitters having a magnetic moment parallel to said second one of said receivers;

simultaneously inverting said induction signals measured parallel and perpendicular to said instrument axis to obtain final values of said invaded zone conductivity, said radial extent and said horizontal and vertical conductivities.

33. The method as defined in claim 30 wherein said step of generating said axial model further comprises:

calculating a layered response of said logging instrument to said model for said two-frequency alternating current;

calculating whole space responses of said instrument to said two-frequency alternating current using conductivity values from said model;

determining a difference between said whole space responses and said layered responses;

calculating adjusted two-frequency induction signals from said two-frequency induction signals and said difference between said whole space and said layered responses; and repeating said step of generating said axial model, and repeating said steps of calculating layered response, calculating whole space response, determining said difference between said whole space and layered responses, and calculating said adjusted two-frequency signals until said difference between said layered and whole space responses falls below a preselected threshold.

34. The method as defined in claim 30 wherein said step of generating said model comprises:

estimating an axial distribution of said conductivities comprising, calculating a relative angle of rotation of said one of said orthogonal axes which is perpendicular to said instrument axis, with respect to a direction of said horizontal conductivity and said vertical conductivity, from said received signals measured perpendicular to said instrument axis, calculating an intermediate measurement tensor by rotating magnitudes of said receiver signals through a negative of said angle of rotation, calculating a relative angle of inclination of one of said orthogonal axes parallel to said axis of said instrument, with respect to said direction of said vertical conductivity, from said rotated magnitudes, rotating said rotated magnitudes through a negative of said angle of inclination, calculating said horizontal conductivity from said magnitudes of said receiver signals after said second step of rotation, calculating an anisotropy parameter from said magnitudes after said second step of rotation, and calculating said vertical conductivity from said horizontal conductivity and said anisotropy parameter; and axially inverting said initial estimate to generate a said model of said conductivity distribution.

35. The method as defined in claim 30 wherein said step of generating said model of axial distribution comprises estimating positions of layer boundaries, comprising:

calculating a first derivative with respect to depth of induction signals made at a selected frequency;

calculating a second derivative with respect to depth of said induction signals;

muting said second derivative;

selecting layer boundaries at axial positions where said muted second derivative is not equal to zero and where said first derivative changes sign;

thickness filtering said selected layer boundaries.

36. The method as defined in claim 35 further comprising repeating said steps of calculating said first and said second derivatives, muting, selecting and filtering, for transverse induction measurements made at a different alternating current frequency than said selected frequency, and selecting locations of layer boundaries where said thickness filtered selected layer boundaries occur at the same axial position for both said frequencies.

37. The method as defined in claim 35 wherein said step of thickness filtering comprises eliminating ones of said selected boundaries having an axial spacing equal to a spacing between an induction transmitter and an induction receiver used to measure said transverse induction signals.

38. The method as defined in claim 35 wherein said step of thickness filtering comprises eliminating ones of said selected boundaries having an axial spacing less than an axial resolution of said transverse electromagnetic induction signals.

39. The method as defined in claim 30 wherein said step of generating said model comprises determining axial positions of layer boundaries, comprising:

Fourier transforming induction signals measured at a selected frequency into the spatial frequency domain;

low pass filtering said Fourier transformed signals at a cutoff about equal to an axial resolution of said induction signals;

calculating a central first derivative of said filtered Fourier transformed signals;

calculating an inverse Fourier transform of said central first derivative;

selecting roots of said inverse Fourier transformed central first derivative; and testing localized properties of said inverse Fourier transformed central first derivative within a selected number of data sample points of said roots, thereby providing indications of formation layer boundaries at axial positions most likely to be true ones of said formation layer boundaries.

* * * * *